United States Patent
Kim

(10) Patent No.: US 10,688,847 B2
(45) Date of Patent: Jun. 23, 2020

(54) HEAT PUMP SYSTEM FOR VEHICLE

(71) Applicants: Hyundai Motor Company, Seoul (KR); Kia Motors Corporation, Seoul (KR)

(72) Inventor: Jae Yeon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 109 days.

(21) Appl. No.: 15/968,244

(22) Filed: May 1, 2018

(65) Prior Publication Data

US 2019/0176572 A1 Jun. 13, 2019

(30) Foreign Application Priority Data

Dec. 8, 2017 (KR) .................. 10-2017-0168212

(51) Int. Cl.
*B60H 1/00* (2006.01)
*B60H 1/32* (2006.01)

(52) U.S. Cl.
CPC ..... *B60H 1/00921* (2013.01); *B60H 1/00278* (2013.01); *B60H 1/00428* (2013.01); *B60H 1/00885* (2013.01); *B60H 1/00899* (2013.01); *B60H 1/32284* (2019.05); *B60H 2001/00307* (2013.01); *B60H 2001/00928* (2013.01)

(58) Field of Classification Search
CPC ............. B60H 1/004; B60H 1/00921; B60H 1/00899; B60H 1/32284; B60H 1/00428; B60H 1/00885; B60H 1/00278; B60H 2001/00307; B60H 2001/00928
See application file for complete search history.

(56) References Cited

U.S. PATENT DOCUMENTS

| | | | |
|---|---|---|---|
| 6,170,270 B1 | 1/2001 | Arshansky et al. | |
| 7,975,757 B2 * | 7/2011 | Nemesh | B60H 1/00278 165/42 |
| 8,215,432 B2 | 7/2012 | Nemesh et al. | |
| 8,899,062 B2 | 12/2014 | Kadle et al. | |
| 9,109,840 B2 | 8/2015 | Kadle et al. | |

(Continued)

FOREIGN PATENT DOCUMENTS

| | | |
|---|---|---|
| CN | 103380339 A | 10/2013 |
| JP | 2005-012890 A | 1/2005 |
| JP | 5336033 B2 | 11/2013 |

*Primary Examiner* — Emmanuel E Duke
(74) *Attorney, Agent, or Firm* — Mintz Levin Cohn Ferris Glovsky and Popeo, P.C.; Peter F. Corless

(57) ABSTRACT

A heat pump system for a vehicle includes: a first cooling apparatus including a first radiator, an electric product including at least one motor, and at least one first water pump which are connected with a first coolant line; a second cooling apparatus including a second radiator and a second water pump which are connected with a second coolant line; a battery module provided at a battery coolant line selectively connected with the second coolant line; a cooling device connected with the battery coolant line through a second valve; a heating device connected with the battery coolant line through a third valve; and a centralized energy (CE) module connected with the coolant line and the first and second connection lines in order to supply a coolant of a low temperature to the cooling device, and to supply a coolant of a high temperature to the heating device.

23 Claims, 8 Drawing Sheets

(56) References Cited

U.S. PATENT DOCUMENTS

| | | |
|---|---|---|
| 9,239,193 B2 | 1/2016 | Kadle et al. |
| 9,623,719 B2 | 4/2017 | Hatakeyama et al. |
| 9,701,215 B1* | 7/2017 | Kim .................... B60L 11/1874 |
| 2005/0022983 A1 | 2/2005 | Kadle et al. |
| 2005/0061497 A1 | 3/2005 | Amaral et al. |
| 2009/0280395 A1* | 11/2009 | Nemesh ............. B60H 1/00278 |
| | | 429/62 |
| 2013/0283838 A1 | 10/2013 | Kadle et al. |
| 2017/0106725 A1* | 4/2017 | Kim .................... B60H 1/00428 |
| 2017/0197490 A1* | 7/2017 | Enomoto ........... B60H 1/00899 |
| 2018/0111443 A1* | 4/2018 | Kim .................... B60H 1/00278 |
| 2018/0117984 A1* | 5/2018 | Kim .................... B60H 1/00899 |
| 2018/0117990 A1* | 5/2018 | Kim .................... B60H 1/00385 |

\* cited by examiner

HEAT PUMP SYSTEM FOR VEHICLE

CROSS-REFERENCE TO RELATED APPLICATION

This application claims under 35 U.S.C. § 119(a) the benefit of Korean Patent Application No. 10-2017-0168212 filed in the Korean Intellectual Property Office on Dec. 8, 2017, the entire contents of which are incorporated herein by reference.

BACKGROUND

(a) Technical Field

The present disclosure relates to a heat pump system for a vehicle, more particularly, to a heat pump system for a vehicle for cooling or heating an inside of the vehicle selectively using a coolant of a high temperature or a coolant of a low temperature.

(b) Description of the Related Art

In general, an air conditioner for a vehicle includes an air conditioner system for circulating coolant in order to heat or cool an inside of the vehicle.

The air conditioner system may maintain a pleasant indoor environment by maintaining an internal temperature of a vehicle at a proper temperature regardless of change in an external temperature, and is configured to heat or cool an inside of the vehicle by heat exchange using an evaporator during a procedure where coolant discharge through drive of a compressor again circulates to the compressor through a condenser, a receiver dryer, an expansion valve, and the evaporator.

That is, an air conditioner system condenses gaseous coolant of high temperature and high pressure compressed from a compressor in a cool mode of summer to reduce temperature and humidity inside a vehicle through evaporation in an evaporator by utilizing a receiver dryer and an expansion valve.

Recently, along with growing interest in energy efficiency and addressing environmental pollution, there is a need to develop an environmentally-friendly vehicle capable of substantially replacing an internal combustion engine vehicle. Environmentally-friendly vehicles can be classified into an electric vehicle driven by using a fuel cell or electricity as a power source and a hybrid vehicle driven using an engine and a battery.

Among environmentally-friendly vehicles, an electric vehicle (or a hybrid vehicle) does not use a separate heater unlike an air conditioner of a general vehicle. An air conditioner applied to the environmentally-friendly vehicle generally refers to a heat pump system.

Typically, an electric vehicle converts chemical reaction energy of oxygen and hydrogen into electrical energy to generate a driving torque. During this procedure, heat energy is generated by a chemical reaction inside a fuel cell. Ensuring the performance of a fuel cell is essential in order to efficiently remove the generated heat.

Further, in a hybrid vehicle, together with an engine operated by a general fuel, a motor is driven using the above fuel cell or electricity from an electric battery to generate a driving torque. Accordingly, by efficiently removing heat generated from the fuel cell or the battery and the motor, the performance of the motor may be ensured.

Accordingly, a hybrid vehicle or an electric vehicle according to the related art should include a separate closed circuit as a battery cooling system together with a motor, an electric product, a cooling meant to prevent a battery including a fuel cell from generating heat, and a heat pump system.

Therefore, the size and weight of a cooling module disposed at a forward direction of a vehicle, and a layout of connection pipes for supplying a refrigerant and a coolant to a heat pump system, a cooling means, and the battery cooling system inside an engine compartment is complicated.

Further, in order to obtain optimal performance of the battery, a battery cooling system for warming up or cooling the battery according to a state of the vehicle is separately provided. A plurality of valves for connecting connection pipes with each other is applied. Due to frequent opening/closing operations of the valves, noise and vibration are transferred to an inside of the vehicle so that ride comfort is deteriorated.

The above information disclosed in this Background section is only for enhancement of understanding of the background of the disclosure and therefore it may contain information that does not form the prior art that is already known in this country to a person of ordinary skill in the art.

SUMMARY

The present disclosure provides a heat pump system for a vehicle having advantages of selectively heat-exchanging heat energy generated from a coolant upon condensing and evaporation of the coolant to control an internal temperature of the vehicle using a heat-exchanged coolant of a low temperature or a high temperature.

An exemplary embodiment of the present disclosure provides a heat pump system for a vehicle which improves the heating efficiency of the vehicle using a waste heat of an electric product and a battery module, and the whole travel distance of the vehicle by efficiently controlling a battery module to represent the optimal performance of the battery module.

An exemplary embodiment of the present disclosure provides a heat pump system of a vehicle including: a first cooling apparatus including a first radiator, an electric product including at least one motor, and at least one first water pump which are connected with a first coolant line, the first cooling apparatus configured to circulate a coolant through the first coolant line; a second cooling apparatus including a second radiator and a second water pump which are connected with a second coolant line, the second cooling apparatus configured to circulate the coolant through the second coolant line; a battery module provided at a battery coolant line selectively connected with the second coolant line; a cooling device connected with the battery coolant line through a second valve so as to configure a first connection line for cooling an inside of the vehicle by selectively forming an independent closed circuit, and including a third water pump and a cooler provided at the first connection line; a heating device connected with the battery coolant line through a third valve so as to configure a second connection line for heating the inside of the vehicle by selectively forming the independent closed circuit, and including a fourth water pump and a heater provided at the second connection line; and a centralized energy (CE) module connected with the coolant line and the first and second connection lines in order to supply a coolant of a low temperature to the cooling device, and to supply a coolant of a high temperature to the heating device, and to selectively heat-exchange heat energy generated upon condensing and evaporation of a refrigerant circulating inside the coolant.

The at least one motor comprises two motors that may be coupled at the first coolant line in parallel, and the at least one first water pump comprises two first water pumps that may be disposed in parallel to introduce the coolant into the motors, respectively.

The second cooling apparatus may supply the coolant into the battery coolant line selectively connected by an operation of the first valve to cool the battery module.

The CE module may include a main heat exchanger provided at the second coolant line between the second radiator and the battery module to condense and evaporate a refrigerant; an expansion valve connected with the main heat exchanger through a coolant line; an evaporator connected with the expansion valve through the coolant line, and provided at the first connection line so the cooling device cools the coolant circulating through the first connection line; and a compressor provided at the coolant line between the evaporator and the main heat exchanger.

The refrigerant line may include an internal heat exchanger between the evaporator and the compressor.

The coolant line for connecting the main heat exchanger with the expansion valve, and the coolant line for connecting the evaporator with the compressor may be connected with the internal heat exchanger, respectively.

When the main heat exchanger condenses the refrigerant, the internal heat exchanger may heat-exchange the condensed refrigerant from the main heat exchanger with a refrigerant of a low temperature exhausted from the evaporator to further condense the refrigerant and to introduce the refrigerant to the expansion valve.

The first valve selectively may connect the second coolant line with the battery coolant line between the second radiator and the battery module, and the second valve and the third valve may be provided at the battery coolant line while interposing the battery module therebetween and selectively connects the battery coolant line with the first and second connection lines.

The CE module may include a sub-condenser connected with the compressor through the coolant line between the main heat exchanger and the compressor, and provided at the second connection line so that the heating device heats the coolant circulating through the second connection line; and a sub-expansion valve provided at the coolant line between the sub-condenser and the main heat exchanger.

The first cooling apparatus may include a first branch line connected with the first coolant line between the first radiator and the first water pump through a fourth valve provided at the first coolant line between the first radiator and the first water pump, the battery coolant line may include a second branch line for connecting the battery module with the cooling device and the heating device through the first valve, and for closing connection with the second cooling apparatus, the second coolant line may include a third branch line for separating the battery coolant line and the second coolant line from each other, and a fourth branch line connected with the second coolant line between the second radiator and the second water pump through a fifth valve may be provided at the second coolant line between the second radiator and the second water pump.

When the battery module is cooled together with the electric product in a cooling mode of the vehicle, the coolant may circulate through the electric product by an operation of a first water pump in the first cooling apparatus, the second branch line may be open by an operation of the first valve, the third branch line is open, and connection between the second coolant line and the battery coolant line may be closed by the second and third open lines, the battery coolant line connected with the battery module may be connected with the first connection line by an operation of the second valve, connection between the battery coolant line and the second connection line may be closed by an operation of the third valve, the first branch line may be closed by an operation of the fourth valve, the fourth branch line may be closed by an operation of the fifth valve, and a refrigerant may circulate through the CE module, the main heat exchanger condenses the refrigerant, and operations of the sub-condenser and the sub-expansion valve may stop.

The evaporator may heat-exchange a coolant circulating through the first connection line from the battery coolant line by an operation of the second valve with an internally evaporated refrigerant of a low temperature to cool the coolant, the coolant of the low temperature passed through the evaporator may be supplied to the cooler through the first connection line by an operation of the third water pump, and the coolant of the low temperature passed through the cooler may be supplied to the battery module through the battery coolant line connected by an operation of the second valve to cool the battery module.

The first cooling apparatus may supply the coolant cooled from the first radiator to the main heat exchanger by an operation of the first water pump.

In the second cooling apparatus, the second open branch line may be connected with the second coolant line to form an independent closed circuit, and the coolant cooled from the second radiator is supplied to the main heat exchanger by an operation of the second water pump.

When increasing a temperature of the battery module in a cooling mode of the vehicle, the first cooling apparatus may circulate the coolant through the electric product by an operation of a first water pump, the second branch line may be open by an operation of the first valve, the third branch line is open, and connection between the second coolant line and the battery coolant line may be closed by the second and third open lines, the battery coolant line connected with the battery module and the first connection line may form an independent closed circuit by an operation of the second valve, the battery coolant line may be connected with the second connection line by an operation of the third valve.

The first branch line may be closed by an operation of the fourth valve, the fourth branch line may be closed by an operation of the fifth valve, and a refrigerant may circulate through the CE module, the main heat exchanger and the sub-condenser condense the refrigerant, and an operation of the sub-expansion valve stops.

The sub-condenser may heat-exchange a coolant circulating the second connection line from the battery coolant line by an operation of the third valve with a refrigerant of a high temperature supplied from the compressor to heat the coolant, the coolant of the high temperature may from the sub-condenser is supplied to the heater through the second connection line by an operation of the fourth water pump, and the coolant of the high temperature from the heater may be supplied to the battery module through the battery coolant line connected by an operation of the third valve to increase a temperature of the battery module.

When recovering a waste heat of the battery module and the electric product in a heating mode of the vehicle, the coolant may circulate through the electric produce by an operation of a first water pump in the first cooling apparatus, the second branch line may be closed by an operation of the first valve, the third branch line is closed, and the second coolant line may be connected with the battery coolant line by the second and third closed lines, connection between the battery coolant line and the first connection line may be closed by an operation of the second valve, the battery coolant line and the second connection line may form an independent closed circuit by an operation of the third valve, in a state that the first branch line is open by an operation of the fourth valve, the first coolant line for connecting the electric product with the first radiator may be closed, in a state that the fourth branch line is open by an operation of the fifth valve, the second coolant line for connecting the second water pump with the second radiator may be closed, the coolant may circulate through a second connection line by the fourth water pump in the heating device, and the refrigerant may circulate through the CE module, operations of the expansion valve and the evaporator stop, the sub-expansion valve may be operated to expand and supply the refrigerant from the sub-condenser to the main heat exchanger.

A waste heat generated from the electric product may increase a temperature of the coolant circulating through the first coolant line, a waste heat generated from the battery module may increase a temperature of the coolant circulating through the second coolant line and the battery coolant line, each coolant having an increase temperature from the first coolant line and the second coolant line is recovered while increasing a temperature of the refrigerant from the main heat exchanger, and the heating device supplies the coolant circulating through the second connection line heated by heat-exchanging with a refrigerant of a high temperature from the compressor in the sub-condenser to the heater.

When increasing a temperature of the battery module in a heating mode of the vehicle, the coolant may circulate the electric product by a first water pump in the first cooling apparatus, the second branch line may be open by an operation of the first valve, the third branch line is open, and connection between the second coolant line and the battery coolant line may be closed the second and third open branch lines, connection between the battery coolant line and the first connection line may be closed by an operation of the second valve, the battery coolant line may be connected with the second connection line by an operation of the third valve, in a state that the first branch line is open by an operation of the fourth valve, the first coolant line for connecting the electric product with the first radiator may be closed, in a state that the fourth branch line is open by an operation of the fifth valve, the coolant line for connecting the electric product with the radiator may be closed, and a refrigerant may circulate through the CE module, operations of the expansion valve and the evaporator stop, the sub-expansion valve may be operated to expand and supply the refrigerant from the sub-condenser to the main heat exchanger.

When cooling the battery module in a heating mode of the vehicle, the coolant may circulate through the electric product by an operation of a first water pump in the first cooling apparatus, the second branch line may be open by an operation of the first valve, the third branch line is open, and connection between the second coolant line and the battery coolant line is closed by the second and third open branch lines, the battery coolant line connected with the battery module may be connected with the first connection line by an operation of the second valve, the battery coolant line and the second connection line may form an independent closed circuit by an operation of the third valve, the first branch line may be closed by an operation of the fourth valve, the fourth branch line may be closed by an operation of the fifth valve, and a refrigerant may circulate through the CE module, the main heat exchanger and the sub-condenser condense the refrigerant, and an operation of the sub-expansion valve stops.

In a dehumidification mode of the vehicle, the coolant may circulate through the electric product by a first water pump in the first cooling apparatus, the second branch line may be closed by an operation of the first valve, the third branch line is closed, and the second coolant line may be connected with the battery coolant line by the second and third closed branch line, the battery coolant line and the first connection line may form an independent closed circuit by an operation of the second valve, the battery coolant line and the second connection line may form an independent closed circuit by an operation of the third valve, the first branch line may be closed by the fourth valve, the fourth branch line may be closed by an operation of the fifth valve, the coolant may circulate through first and second connection lines by operations of the third and fourth water pumps in the cooling device and the heating device, respectively, and a refrigerant may circulate through the CE module.

The heating device may further include an internal heater provided at the second connection line, when increasing a temperature of the battery module using the internal heater in a state that a cooling or heating mode of the vehicle stops, operations of the first and second water pumps may stop to stop the circulation of the coolant in the first and second cooling apparatus, circulation of the refrigerant may stop in the CE module, the second branch line may be open by an operation of the first valve, the third branch line is closed, and the battery coolant line may be connected with the second open branch line, connection between the battery coolant line and the first connection line may be closed by an operation of the second valve, and the battery coolant line may be connected with the second connection line by an operation of the third valve.

A fifth water pump may be provided between the second branch line and the battery module in the battery coolant line.

The heating device may further include an internal heater provided at the second connection line.

A second reservoir tank connected with the fourth branch line is provided between the second radiator and the main heat exchanger.

The first, fourth and fifth valves may be 3-way valve, the second and third valves may be a 4-way valve.

The main heat exchanger, the sub-condenser, and the evaporator may be a water cooling heat exchanger into which a coolant is introduced.

The refrigerant circulating through the CE module may be a R152-a or R744 or R290 refrigerant.

The heating device may further include an internal heater provided at the second connection line.

The second radiator may be disposed in a forward direction of the first radiator based on forward and reward directions of the vehicle.

As described above, in the heat pump system for a vehicle according to an exemplary embodiment of the present disclosure, a system may be simplified and a layout of connection pipes in which a coolant circulates may be simplified by selectively heat-exchanging heat energy generated from a refrigerant upon condensation and evaporation of the refrigerant to control an internal temperature of the vehicle using a heat-exchanged coolant of a low temperature or a high temperature.

Further, the present disclosure may improve heating efficiency of the vehicle using waste heat of an electric product and a battery module, and may increase the whole travel distance of the vehicle through efficient temperature control of a battery module in order to obtain the optimal performance of the battery module.

Moreover, the present disclosure may reduce a size and weight by packaging a Centralized Energy Module (CEmodule) for generating heat energy through condensing and evaporation of a coolant.

In addition, the present disclosure may prevent noise, vibration and operational instability from being generated as compared with an air conditioner according to the related art by using an R152-a, or an R744, or an R290 of the high performance in a CE module.

Further, the present disclosure may increase sub-cool of a refrigerant to improve cooling performance and efficiency by configuring a sub-condenser and an internal heat exchanger together in order to increase a condensation amount of the refrigerant in the CE module.

In addition, the present disclosure may reduce a manufacturing cost and weight, and may improve space utilization by simplifying the entire system.

DETAILED DESCRIPTION OF THE EMBODIMENTS

Figure 1:
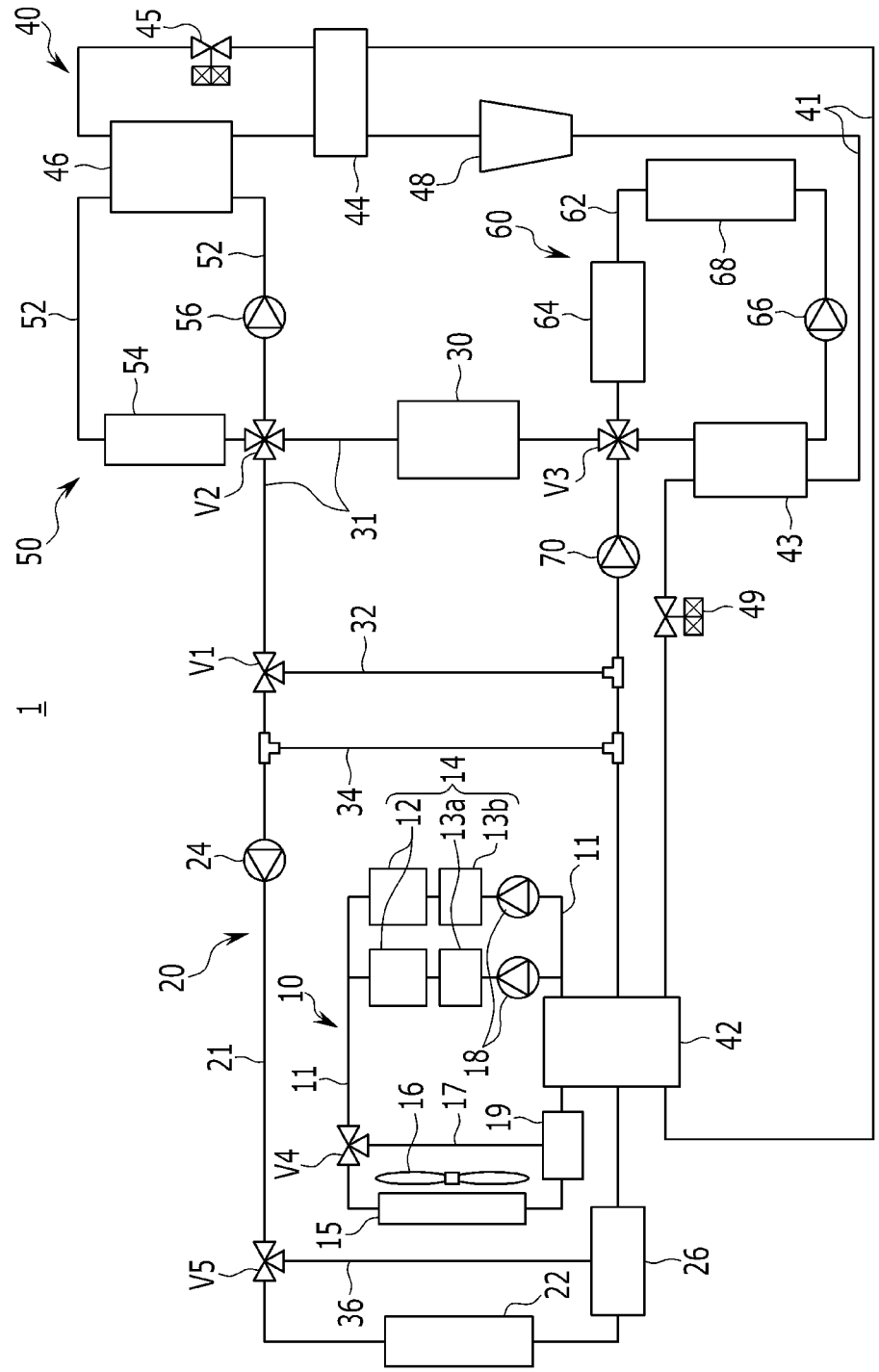
FIG. 1 is a block diagram illustrating a heat pump system for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present disclosure will hereinafter be described in detail with reference to the accompanying drawings.

Although embodiments have been described with reference to a number of illustrative embodiments thereof, it should be understood that numerous other modifications and embodiments can be devised by those skilled in the art that will fall within the spirit and scope of the principles of the present disclosure.

The drawings and description are to be regarded as illustrative in nature and not restrictive, like reference numerals designate like elements throughout the specification.

Since the size and the thickness of each configuration shown in drawings are optionally indicated for better understanding and ease of description, the present disclosure is not limited to shown drawings, and the thickness of layers, films, panels, regions, etc., may be exaggerated for clarity.

FIG. 1 is a block diagram illustrating a heat pump system for a vehicle according to an exemplary embodiment of the present disclosure.

The heat pump system 1 for a vehicle according to an exemplary embodiment of the present disclosure selectively heat-exchanges heat energy generated from a coolant upon condensing or evaporation to perform a cooling mode or a heating mode of the vehicle using only a coolant of a low temperature or a high temperature.

The heat pump system 1 is applicable to hybrid vehicles or electric vehicles.

Referring to FIG. 1, the heat pump system 1 includes a first cooling apparatus 10, a second cooling apparatus 20, a battery module 30, a CE module 40, a cooling device 50, and a heating device 60.

First, the first cooling device 10 includes a first radiator 15, an electric product 14 including at least one motor 12, and at least one first water pump 18 connected with each other through a first coolant line 11, and circulates the coolant to the first coolant line 11 in order to cool the electric product 14.

The first radiator 15 is disposed in a forward direction of the vehicle, and a cooling fan 16 is disposed in a rearward direction of the vehicle and cools a coolant through an operation of a cooling fan 16 and heat exchange with an external air.

Here, the at least one motor comprises two motors 12 that are configured to be connected with the first coolant line 11 in parallel.

Further, the at least one first water pump comprises two water pumps 18 that may be configured to be disposed in parallel so that the coolant may be introduced into the respective motors 12 which are disposed in parallel.

Here, the electric product 14 an electric power control unit (EPCU) 13a and an inverter 13b. The power control apparatus 13a and the inverter 13b may be disposed in parallel to each other corresponding to the two motors 12.

Meanwhile, the electric product 14 may include an on board charger (OBC) instead of the inverter 13b.

That is, the power control apparatus 13a and the inverter 13b may radiate heat during travel. When the charger charges the battery module 30, the charger may radiate the heat.

Accordingly, in a heating mode of the vehicle, when the waste heat of the electric product 14 is recovered, the heat may be recovered from the power control apparatus 13a and the inverter 13b. Further, when the charger is applied, the heat radiated from the charger may be recovered upon charging the battery module 30.

Meanwhile, the first cooling device 10 may include a first branch line 17 connected with the first coolant line 11 between the first radiator 15 and the first water pump 18 through a fourth valve V4 provided at the first coolant line 11 between the first radiator 15 and the first water pump 18.

When the first branch line 17 absorbs waste heat radiated from the electric product 14 to increase a temperature of the coolant, the first branch line 17 is selectively open through an operation of the fourth valve V4. In this case, the first coolant line 11 connected with the first radiator 15 is closed through an operation of the fourth valve V4.

Moreover, a first reservoir tank 19 connected with the first branch line 17 may be provided between the first radiator 15 and the first water pump 18. The first reservoir tank 19 may store a coolant in which cooling finishes introduced from the first radiator 22.

In the present exemplary embodiment, the second cooling apparatus 20 includes a second radiator 22 and second water pump 24 connected with each other through a second coolant line 21, and circulates the coolant in the second coolant line 21.

The second cooling device 20 may supply the coolant cooled from the second radiator 22 to the battery module 30 or the CE module 40.

Here, the second radiator 22 is disposed in a forward direction of the first radiator 13, and cools the coolant through an operation of the cooling fan 14 and heat exchange with an external air.

The second cooling device 20 configured as above may circulate the coolant cooled from the second radiator 22 along the second coolant line 21 through an operation of the second water pump 24.

The battery module 30 is provided at a battery coolant line 31 selectively connected with the second coolant line 21 through a first valve V1.

Here, the first valve V1 may selectively connect the second coolant line 21 to the battery coolant line 31 between the second radiator 22 and the battery module 30.

The battery module 30 supplies power to the electric product 14, and a water cooling type battery module 30 is formed to be cooled by a coolant flown along the battery coolant line 31.

That is, the battery module 30 is selectively connected with the second cooling apparatus 20 through the battery coolant line 31 according to an operation of the first valve V1, and may be cooled by the coolant circulating through the battery coolant line 31.

In the present exemplary embodiment, the cooling device 50 is selectively connected with the battery coolant line 31 through a second valve V2. The cooling device 50 includes a first connection line 51 to cool an inside the vehicle by selectively an independent closed circuit. Further, the cooling device 50 may include a cooler 54 and a third water pump 56 which are provided at the first connection line 52.

The cooling device 50 configured as above may cool the cooler 54 using a coolant of a low temperature which circulates along a first connection line 52 through an operation of the third water pump 56, and cooled by the CE module 40.

Here, the cooler 54 is provided inside HVAC module (not shown) of the vehicle. Accordingly, air supplied to an inside of the vehicle from the HVAC module passes through the cooler 54 to heat-exchange with the coolant of the low temperature and to be introduced into the inside of the vehicle.

In the present exemplary embodiment, the heating device 60 is selectively connected with the battery coolant line 31 through the third valve V3. The heating device 60 includes a second connection line 62 to cool the inside of the vehicle by selectively forming an independent closed circuit, and may include a heater 64 and a fourth water pump 66.

Here, the heating device 60 may include an internal heater 68 provided at the second connection line 62.

When a temperature of the coolant circulating through the second connection line 62 is lower than an indoor heating temperature, the internal heater 68 may be selectively operated to increase a temperature of the coolant.

Moreover, the coolant of a high temperature heated from the internal heater 68 may increase the temperature of the battery module 30. The internal heater 68 may include an electric heater operated by power supply.

The heating device 60 configured as above may heat the heater 64 using the coolant of a high temperature which circulates along a second connection line 62 through an operation of the fourth water pump 66, and is heated by the CE module 40.

Here, the heater 64 is provided inside HVAC module (not shown) of the vehicle. Accordingly, air supplied to an inside of the vehicle from the HVAC module passes through the heater 64 to heat-exchange with the coolant of the high temperature and to be introduced into the inside of the vehicle.

The cooler 54 and the heater 64 may be configured by a cooling water type cooler and heater which is cooled and heated according to a temperature of the cooling introduced into the inside of the vehicle.

Meanwhile, the second valve V2 and the third valve V3 are provided at the battery cooling water line 31 while interposing the battery module 30 therebetween. The second and third valves V2 and V3 may connect the battery coolant line 31 with the first and second connection lines 52 and 62, respectively.

Moreover, a fifth water pump 32 may be provided at the battery coolant line 31 between the battery module 30 and the second radiator 22.

Here, the second and third valves V2 and V3 may be a 4-way valve. In addition, the first, second, third, fourth, fifth water pumps 18, 24, 56, 66, 70 may be an electric water pump.

In the present exemplary embodiment, the CE module 40 is connected with the second coolant line 21 and the first and second connection lines 52 and 62, respectively in order to supply the coolant of a low temperature to the cooling device 50 and supply the coolant of a high temperature to the heating device 60.

The CE module 40 selectively heat-exchanges heat energy generated upon condensing and evaporation of an internally circulating refrigerant, and supplies the heat-exchanged coolant of a low temperature or a high temperature to the cooling device 50 and the heating device 60, respectively.

The, the refrigerant may include an R152-a refrigerant, or an R744 refrigerant, or an R290 refrigerant of high performance.

That is, the coolant of a low temperature is supplied to the cooler 54 through the first connection line 52, and the cooler 54 of a high temperature is supplied to the heater 64 through the second connection line 62.

Here, the CE module 40 includes a main heat exchanger 42, an expansion valve 45, an evaporator 46, and a compressor 48.

First, the main heat exchanger 42 is provided at the second coolant line 21 between the second radiator 22 and the battery module 30. Moreover, the main heat exchanger 42 is connected with the first coolant line 11. The main heat exchanger 42 may condense or evaporate the coolant.

Accordingly, the main heat exchanger 42 heat-exchanges the introduced refrigerant with the coolant supplied through the first and second coolant lines 11 and 21 to condense or evaporate the introduced refrigerant, and supplied the heat energy generated upon the condensing and the evaporation of the coolant to the coolant to increase or reduce the temperature of the coolant.

The expansion valve 45 may be connected with the main heat exchanger 42 through a refrigerant line 41. The expansion valve 45 receives the refrigerant passed through the main heat exchanger 42 to expand the refrigerant. The expansion valve 45 may include a mechanical expansion valve or an electronic expansion valve.

The evaporator 46 is connected with the expansion valve 45 through the refrigerant line 41, and may be provided at the first connection line 52 so that the cooling device 50 cools the coolant circulating through the first connection line 52.

The evaporator 46 heat-exchanges the introduced refrigerant with the coolant to evaporate the refrigerant, and supplies heat energy of a low temperature generated upon evaporating the refrigerant to the coolant to reduce the temperature of the coolant.

Further, the compressor 48 is provided at the refrigerant line 41 between the evaporator 46 and the main heat exchanger 42. The compressor 48 compresses a refrigerant in a gaseous state exhausted from the evaporator 46.

Here, an internal heat exchanger 44 may be provided at the refrigerant line 41 between the evaporator 46 and the compressor 48.

The refrigerant line 41 for connecting the main heat exchanger to the expansion valve 45 and the refrigerant line 41 for connecting the evaporator 46 to the compressor 48 may be connected with the internal heat exchanger 44.

Moreover, when the main heat exchanger 42 condenses the refrigerant, the internal heat exchanger 44 heat-exchanges the refrigerant condensed from the main heat exchanger 42 with a refrigerant of a low temperature exhausted from the evaporator 46 to further condense the refrigerant, and to introduce the condensed refrigerant into the expansion valve 45.

Meanwhile, an accumulator (not shown) may be provided between the internal heat exchanger 44 and the compressor 48.

The accumulator supplies only refrigerant at a gaseous state to the compressor 48 to improve efficiency and durability of the compressor 48.

Accordingly, the refrigerant exhausted from the evaporator 46 may pass through the internal heat exchanger 44 to heat-exchange with the refrigerant from the main heat exchanger 42, and may then be supplied to the compressor 48.

Here, the condensed refrigerant exhausted from the main heat exchanger 42 and the refrigerant of a low temperature and a low pressure exhausted from the evaporator 46 are introduced into the internal heat exchanger 44. Accordingly, the internal heat exchanger 44 may further heat-exchange the refrigerant of a low temperature with the condensed refrigerant to further reduce the refrigerant and to increase a condensed amount.

In this manner, the internal heat exchanger 44 may further condense the refrigerant condensed from the main heat exchanger 42 to increase sub-cool of the refrigerant so that a coefficient of performance (COP) being a coefficient of cooling performance to power consumption of the compressor may be improved.

Meanwhile, the CE module 40 may include a sub-condenser 43 and a sub-expansion valve 49.

First, the sub-condenser 43 is connected with the compressor 48 through the refrigerant line 41 between the main heat exchanger 42 and the compressor 48, and is provided at the second connection line 62 so that the heating device 60 heats the coolant circulating through the second connection line 62.

In addition, the sub-expansion valve 49 may be provided at the refrigerant line 41 between the sub-condenser 43 and the main heat exchanger 42.

When the main heat exchanger 42 condenses the refrigerant, the sub-condenser 43 primarily condensed the refrigerant exhausted from the compressor 48. Accordingly, the main heat exchanger 42 may further condense the refrigerant condensed from the sub-condenser 43 to increase a condensed amount of the refrigerant.

Here, the sub-expansion valve 49 may pass the refrigerant to the main heat exchanger 42 without expanding the refrigerant.

On the contrary, when the main heat exchanger 42 may evaporate the refrigerant, the sub-expansion valve 49 expands the refrigerant exhausted from the sub-condenser 43 to supply the expanded refrigerant to the main heat exchanger 42.

Meanwhile, the present exemplary embodiment has described to mutually heat-exchange the refrigerant of a low temperature evaporated from the internal heat exchanger 44 with the condensed refrigerant as one embodiment. The present disclosure is not limited thereto. Some of the refrigerant exhausted from the internal heat exchanger 44 is bypassed and cooled. A remaining refrigerant introduced from the internal heat exchanger 44 may be cooled by simultaneously the cooled refrigerant and a refrigerant of a low temperature exhausted from the evaporator to increase a sub-cool of the refrigerant.

The main heat exchanger 42, the sub-condenser 43, and the evaporator 46 may be a water cooling type heat exchanger in which a coolant is introduced.

When the expansion valve 45 is an electronic valve, the refrigerant may sequentially pass through the sub-condenser 43, the main heat exchanger 42, and the internal heat exchanger 44 to be expanded by the expansion valve 45, and the expanded refrigerant may be introduced into the evaporator 46. The refrigerant exhausted from the evaporator 46 may pass through the internal heat exchanger 44, and may be exhausted into the compressor 48.

In this case, a sensor for measuring a temperature and pressure of the refrigerant is separately provided at the refrigerant line 41 for connecting the internal heat exchanger 44 to the compressor 48. The sensor may measure a superheat degree of the refrigerant to control an expansion amount of the expansion valve 45.

Meanwhile, in the present exemplary embodiment, the battery coolant line 31 connects the battery module 30 to the cooling device 50 and the heating device 60 through the first valve V1, and includes a second branch line 32 for closing connection with the electric product cooling apparatus 20.

The first valve V1 selectively connects the second coolant line 21 with the battery coolant line 31 or selectively connects the battery cooling line 31 with the second branch line 32 to control the flow of the coolant.

That is, when the battery module 30 is cooled using the coolant cooled from the second radiator 22, the first valve V1 may connect the battery coolant line 31 to the second coolant line 21 connected with the second radiator 22, and may close the second branch line 32.

Further, when the battery module 30 is cooled or heated using the coolant heat-exchanged with the refrigerant when the coolant circulates through the cooling device 50 and the heating device 60, the first valve V1 may open the second branch line 32, and close connection between the second coolant line 21 and the battery coolant line 31.

In this case, the second and third valves V2 and V3 may be selectively operated to connect the battery coolant line 31 with the first and second connection lines 52 and 62, respectively.

Accordingly, the coolant of a low temperature heat-exchanged with the refrigerant in the evaporator 46 may be introduced into the battery module 30 through the second branch line 32 opened by the first valve V1, the first connection line 52 connected by the second valve V2, and the battery coolant line 31 to efficiently cool the battery module 30.

Conversely, the coolant of the high temperature heat-exchanged with the refrigerant in the sub-condenser 43 may be introduced into the battery module 30 through the second branch line 32 opened by the first valve V1, the second connection line 62 connected by the third valve V3, and the battery coolant line 31 to efficiently heat the battery module 30.

In the present exemplary embodiment, a third branch line 34 for separating the battery coolant line 31 from the second coolant line 21 is provided at the second coolant line 21.

The third branch line 34 may be selectively connected at the second coolant line 21 so that the second cooling apparatus 20 configures a closed circuit independent through the second coolant line 21.

Here, a separate valve may be provided at a point in which the third branch line 34 crosses the second coolant line 21 and the battery coolant line 31 or on the third branch line 34. The separate valve may include a 3-way valve or a 2-way valve.

Further, a fourth branch line 36 connected with the second coolant line 21 between the second radiator 22 and the second water pump 24 through a fifth valve V5 may be provided at the second coolant line 21 for connect the second radiator 22 with the second water pump 24.

When waste heat generated from the battery module 30 is absorbed to increase a temperature of the coolant, the fourth branch line 36 is selectively opened by an operation of the fifth valve V5. In this case, the second coolant line 21 connected with the second radiator 22 is closed by an operation of the fifth valve V5.

Meanwhile, the second reservoir tank 26 connected with the fourth branch line 36 may be provided between the second radiator 22 and the main heat exchanger 42. The second reservoir tank 26 may store the cooled coolant introduced from the second radiator 22.

Here, the first, fourth and fifth valves V1, V4, and V5 may include a 3-way valve capable of distributing a flow rate.

Further, although the present exemplary embodiment has described that a valve is not included in the third branch line 34 as an embodiment, the present disclosure is not limited thereto. The valve is applicable as necessary for selective open of the third branch line 34.

That is, the third branch line 34 may control a flow rate of the coolant circulating through operations of the second coolant line 21, the battery coolant line 31 and second and fourth branch lines 32 and 36, the second and third water pumps 24 and 56 selectively connected with each other according to each mode of the vehicle (heating, cooling, dehumidification) to control opening of the third branch line 34.

Hereinafter, an operation in each mode of the heat pump system 1 for a vehicle according to an exemplary embodiment of the present disclosure configured as above will be described with reference to FIG. 2 to FIG. 8.

First, an operation of cooling the battery module 30 together with the electric product 14 in a cooling mode of the vehicle is described with reference to FIG. 2.

Figure 2:
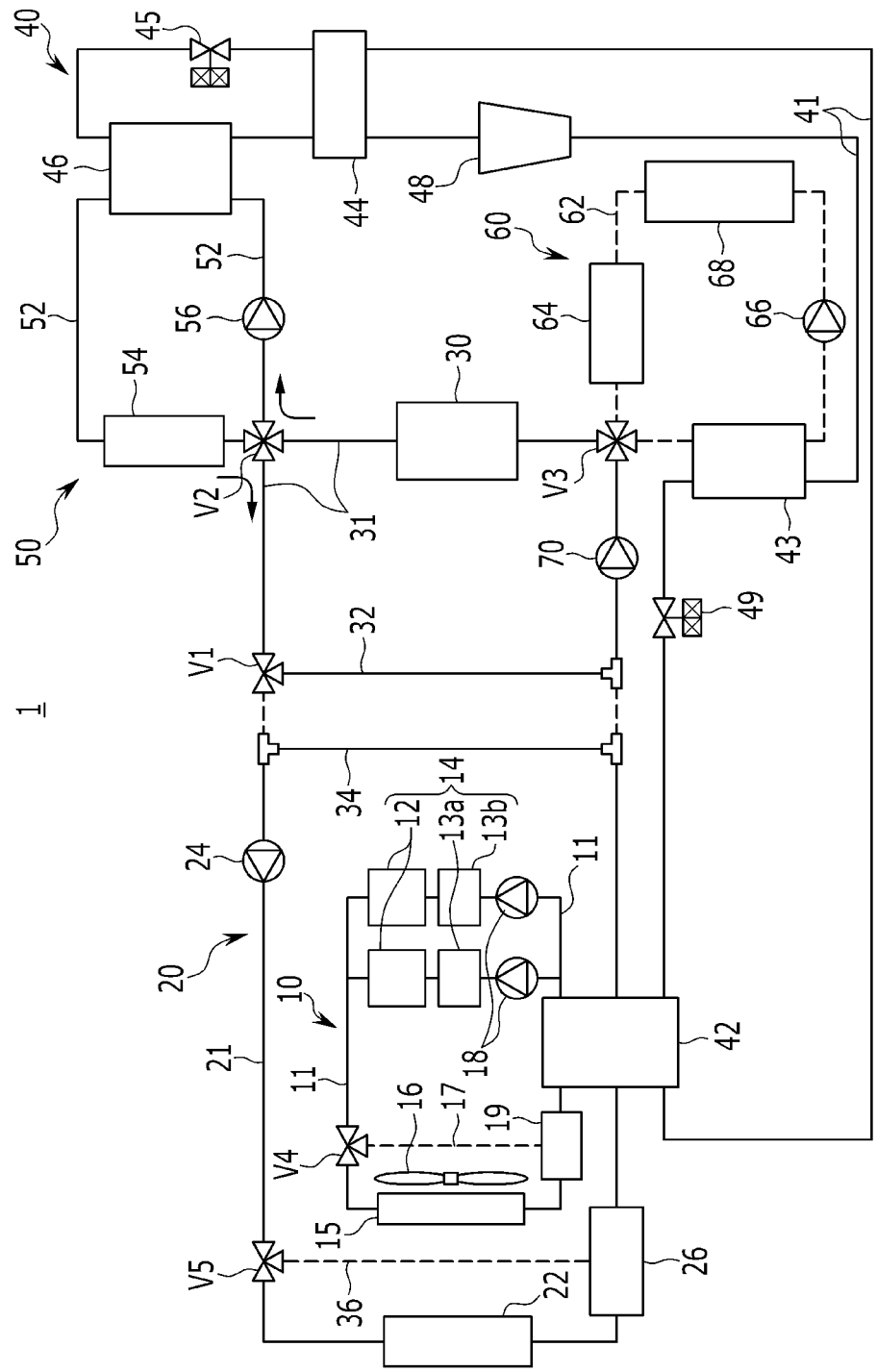
FIG. 2 is an operating state diagram illustrating an operation of cooling a battery module in a cooling mode of a vehicle in the heat pump system for a vehicle according to an exemplary embodiment of the present disclosure.

FIG. 2 is an operating state diagram illustrating an operation of cooling a battery module in a cooling mode of a vehicle in the heat pump system for a vehicle according to an exemplary embodiment of the present disclosure.

Referring to FIG. 2, in the first cooling device 10, the first water pump 18 is operated to cool the electric product 14. Further, the first branch line 17 is closed through an operation of the fourth valve V4. Accordingly, the coolant cooled from the first radiator 15 is introduced into the motor 12, the power control apparatus 13a, and the inverter 13b which are disposed in parallel.

Moreover, each constituent element of the CE module 40 is operated to circulate the refrigerant through a refrigerant line 41 in order to cool an inside of the vehicle.

The second branch line 32 is open by an operation of the first valve V1. Further, the third branch line 34 is open.

Further, the connection of the second coolant line 21 with the second and third branch lines 32 and 34 open and with the battery coolant line 31 through an operation of the first valve V1 is closed.

In addition, by an operation of the second valve V2, the battery coolant line 31 connected with the battery module 30 is connected with the first connection line 52.

The connection of the second connection line 62 with the battery coolant line 31 is closed by an operation of the third valve V3. Here, in the heating device 60, an operation of the fourth water pump 66 stops, and the flow of the coolant stops at the second connection line 62.

The main heat exchanger 42 of the CE module 40 condenses the refrigerant using the coolant flowing through the first and second coolant lines 21. Further, as an operation of the heating device 60 stops, operations of the sub-condenser 43 and the sub-expansion valve 49 also stop.

Moreover, the fourth branch line 36 is closed by an operation of the fifth valve V5. Simultaneously, the fifth valve V5 opens the second coolant line 21 for connecting the second water pump 24 to the second radiator 22.

Accordingly, each coolant cooled from the second radiator 22 may circulate through the second coolant line 21 connected with the third branch line 34 by an operation of the second water pump 24.

That is, in the second cooling apparatus 20, the third open line 34 may be connected with the second coolant line 21 to form an independent closed circuit. Accordingly, the coolant cooled from the second radiator 22 may circulate by an operation of the second water pump 24.

In addition, the coolant of the battery coolant line 31 circulates through the battery coolant line 31, the first branch line 32, and the first connection line 52 by operations of the third and fifth water pumps 56 and 70.

That is, the coolant circulating through the battery coolant line 31 flows to the first connection line 52 by operations of the second valve V2, the third and fifth water pumps 56 and 70.

Accordingly, the coolant may circulate through the battery coolant line 31 and the first connection line 52.

Here, the internal heat exchanger 44 additionally condenses the refrigerant condensed from the main heat exchanger 42 by heat-exchanging the refrigerant with a refrigerant of a low temperature exhausted from the evaporation 46 to further increase a condensation amount through increase of sub-cool of the refrigerant so that a condensation amount of the refrigerant is increased.

Further, the evaporator 46 heat-exchanges the coolant circulating from the battery coolant line 31 through the first connection line 52 with a refrigerant of a low temperature evaporated inside by an operation of the second valve V2.

The coolant of a low temperature passed through the evaporator 46 is supplied to the cooler 54 through the first connection line 52 by an operation of the third water pump 56.

That is, the refrigerant circulating through the refrigerant line 41 in the CE module 40 is heat-exchanged with the coolant passed through the main heat exchanger 42 to be primarily condensed. Next, the refrigerant exhausted from the main heat exchanger 42 is further heat-exchanged with a refrigerant of a low temperature from the evaporator 46 in the internal heat exchanger 44 so that a condensation amount is further increased.

The coolant having an increased condensation amount is expanded by the expansion valve 45, and is evaporated by the evaporator 46.

In this case, the refrigerant evaporated from the evaporator 46 cools the coolant introduced through the first connection line 52. Here, the refrigerant having an increased condensation amount sequentially passed through the main heat exchanger 42 and the internal heat exchanger 44 may be expanded and supplied in the evaporator 46 to evaporate the refrigerant at a lower temperature.

That is, in the present exemplary embodiment, the internal heat exchanger 44 further condenses the refrigerant to be advantageous in terms of forming a sub-cool of the refrigerant.

Further, since the refrigerant formed therein with the sub-cool is evaporated at a lower temperature in the evaporator 46, a temperature of the coolant heat-exchanged from the evaporator 46 may be reduced so that air conditioning performance and efficiency can be improved.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

Then, an external air introduced into the HVAC module (not shown) is heat-exchanged with the coolant of a low temperature introduced into the cooler 54 to be cooled. After that, the cooled external air may be directly introduced into an inside of the vehicle to cool the inside of the vehicle.

Meanwhile, the coolant of a low temperature passed through the cooler 54 flows through the battery coolant line 31 connected by an operation of the second valve V2 and is introduced into the battery module 30. Accordingly, the battery module 30 may be efficiently cooled by the coolant of a low temperature supplied to the battery cooling line 21.

An operation of heating the battery module 30 in an air conditioning mode of the vehicle is described with reference to FIG. 3.

Figure 3:
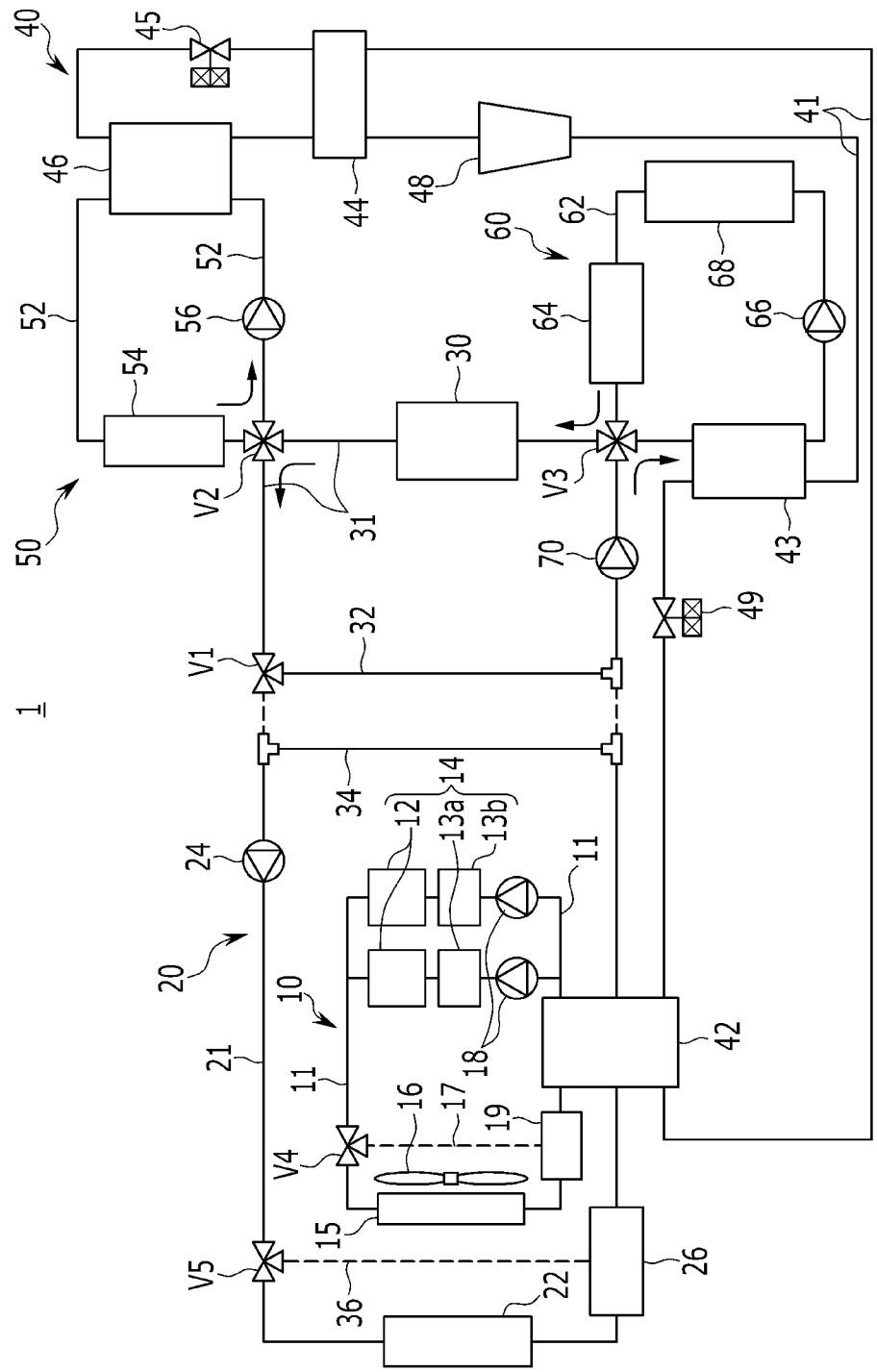
FIG. 3 is an operating state diagram illustrating an operation of heating a battery module in a cooling mode of a vehicle in the heat pump system for a vehicle according to an exemplary embodiment of the present disclosure.

FIG. 3 is an operating state diagram illustrating an operation of heating a battery module in a cooling mode of a vehicle in the heat pump system for a vehicle according to an exemplary embodiment of the present disclosure.

Referring to FIG. 3, in the first cooling apparatus 10, the first water pump 18 is operated in order to cool the electric product 14. Further, the first branch line 17 is closed by an operation of the fourth valve V4. Accordingly, the coolant cooled from the first radiator 15 is introduced into the motor 12, the power control apparatus 13a, and the inverter 13b which are disposed in parallel.

In addition, each constituent element of the CE module 40 is operated to circulate the refrigerant through the refrigerant line 41 in order to cool an inside of the vehicle.

The second branch line 32 is open by an operation of the first valve V1. Moreover, the third branch line 34 is open.

Further, the connection of the second coolant line 21 with the second and third branch lines 32 and 34 open and with the battery coolant line 31 through an operation of the first valve V1 is closed.

In addition, the battery coolant line 31 connected with the battery module 30 and the first connection line 52 form an independent closed circuit by an operation of the second valve V2.

The second connection line 62 is connected with the battery coolant line 31 by an operation of the third valve V3.

Accordingly, in the heating device 60, the fourth water pump 66 is operated, and the coolant flows through the second connection line 62.

Further, the fourth branch line 36 is closed by an operation of the fifth valve V5. Simultaneously, the fifth valve V5 opens the second coolant line 21 for connecting the second water pump 24 with the second radiator 22.

Accordingly, each coolant cooled from the second radiator 22 may circulate through the second coolant line 21 connected with the third branch line 34 by an operation of the second water pump 24.

That is, in the second cooling apparatus 20, the third open branch line 34 may be connected with the second coolant line 21 to form an independent closed circuit. Accordingly, the coolant cooled from the second radiator 22 may circulate by an operation of the second water pump 24.

Meanwhile, the main heat exchanger 42 of the CE module 40 condenses the refrigerant using the coolant flowing through the first and second coolant lines 11 and 21.

Simultaneously, the sub-condenser 43 heat-exchanges the coolant circulating from the battery coolant line 31 through the second connection line 62 with the refrigerant of a high temperature exhausted from the compressor 48 by an operation of the third valve V3 to increase a temperature of the coolant.

Simultaneously, the sub-condenser 43 primarily condenses the refrigerant by heat-exchange with the coolant to supply the condensed refrigerant to the main heat exchanger 42.

Moreover, the sub-expansion valve 49 may supply the refrigerant to the main heat exchanger 42 without expansion.

In addition, the coolant of the battery coolant line 31 circulates through the battery coolant line 31, the second branch line 32, and the second connection line 62 by operations of the fourth and fifth water pumps 66 and 70.

That is, the coolant circulating through the battery coolant line 31 flows the second connection line 62 by operations of the third valve V3, fourth and fifth water pumps 66 and 70.

Accordingly, the coolant may circulate through the battery coolant line 31 and the second connection line 62.

Here, the main heat exchanger 42 additionally condenses the condensed refrigerant passed through the sub-condenser 43 by heat-exchanging the condensed refrigerant with the coolant circulating through the first and second coolant lines 11 and 21 so that a condensation amount of the refrigerant is increased.

Moreover, the internal heat exchanger 44 further condenses the condensed refrigerant from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

In addition, the evaporator 46 heat-exchanges the coolant circulating through the first connection line 52 with an internally evaporated refrigerant of the low temperature by operations of the second valve V2 and the third water pump 56.

The coolant of a low temperature from the evaporator 46 is supplied to the cooler 54 through the first connection line 52 by an operation of the third water pump 56.

That is, the refrigerant circulating through the refrigerant line 41 in the CE module 40 is condensed by heat-exchanging with the coolant of the second connection line 62 passing through the sub-condenser 43. Next, the condensed refrigerant is further condensed by heat-exchanging with the coolant of the first and second coolant lines 11 and 21 passing through the main heat exchanger 42.

In addition, the internal heat exchanger 44 further condenses the refrigerant of a medium temperature exhausted from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

The coolant having an increased condensation amount is expanded by the expansion valve 45, and is evaporated by the evaporator 46.

In this case, the refrigerant evaporated from the evaporator cools the coolant introduced through the first connection line 52. Here, in the evaporator 46, the refrigerant having an increased condensation amount sequentially passes through the main heat exchanger 42 and the internal heat exchanger 44 to be expanded and supplied so that the refrigerant may be evaporated at a lower temperature.

That is, in the present exemplary embodiment, the internal heat exchanger 44 further condenses the refrigerant to be advantageous in terms of forming a sub-cool of the refrigerant.

Further, since the refrigerant formed therein with the sub-cool is evaporated at a lower temperature in the evaporator 46, a temperature of the coolant heat-exchanged from the evaporator 46 may be reduced so that air conditioning performance and efficiency can be improved.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

Then, an external air introduced into the HVAC module (not shown) is heat-exchanged with the coolant of a low temperature introduced into the cooler 54 to be cooled. After that, the cooled external air may be directly introduced into an inside of the vehicle to cool the inside of the vehicle.

Meanwhile, the coolant circulating through the second connection line 62 in the heating device 60 is heat-changed with the refrigerant of a high temperature supplied from the compressor 48 in the sub-condenser 43 so that the temperature of the coolant is increased.

The coolant of a high temperature passed through the sub-condenser 43 is supplied to the heater 64 through the second connection line 62 by an operation of the fourth water pump 66.

Here, although the coolant of a high temperature is introduced into the heater 64 through the second connection line 62, an opening door included in an HVAC module (not shown) is closed not to pass the external air through the heater 64, so that indoor cooling may be prevented from being deteriorated.

The coolant of a high temperature passed through the heater 64 flows through the battery coolant line 31 connected by operations of the third valve V3 and the fifth water pump 70 to be supplied to the battery module 30. Accordingly, a temperature of the battery module 30 may be efficiently increased by the coolant of a high temperature supplied to the battery cooling line 31.

An operation of recovering waste heat of the battery module 30 and the electric product 15 in a heating mode of the vehicle is described with reference to FIG. 4.

Figure 4:
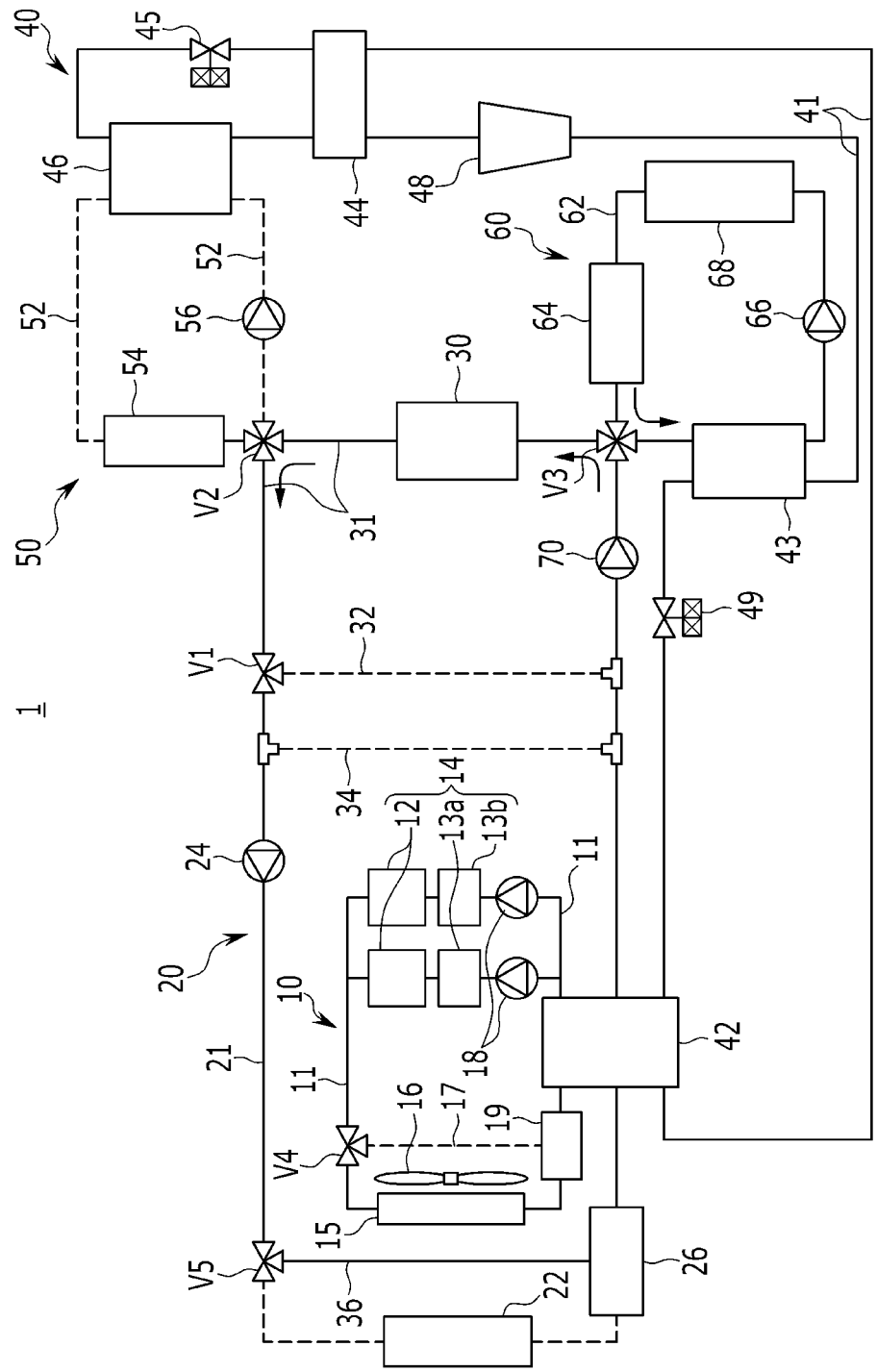
FIG. 4 is an operating state diagram illustrating an operation of recovering waste heat in an electric product and a battery module in a heating mode of a vehicle in the heat pump system for a vehicle according to an exemplary embodiment of the present disclosure.

FIG. 4 is an operating state diagram illustrating an operation of recovering waste heat in an electric product and a battery module in a heating mode of a vehicle in the heat pump system for a vehicle according to an exemplary embodiment of the present disclosure.

Referring to FIG. 4, when waste heat of the electric product 14 and the battery module 30 is recovered in the heating mode of the vehicle, the first cooling apparatus 10 circulates the coolant to the electric product 14 by an operation of the first water pump 18.

Here, the first branch line 17 is open by an operation of the fourth valve V4. In this state, the first coolant line 11 for connecting the electric product 14 with the first radiator 15 is closed.

In addition, each constituent element of the CE module 40 is operated to circulate the refrigerant through the refrigerant line 41 in order to cool an inside of the vehicle.

Here, the second branch line 32 is closed by an operation of the first valve V1, and the third branch line 34 is closed.

Moreover, the second coolant line 21 and the battery coolant line 31 are connected to each other by the second and third branch lines 32 and 34 closed.

The connection of the first connection line 52 with the battery coolant line 31 is closed by an operation of the second valve V2.

Here, in the cooling device 50, an operation of the third water pump 56 stops, and the flow of the coolant stops in the first connection line 52.

Accordingly, as the operation of the cooling device 50 stops, operations of the expansion valve 45 and the evaporator 46 also stop.

Further, the battery coolant line 31 and the second connection line 62 form an independent closed circuit by an operation of the third valve V3.

Here, in the heating device 60, the coolant may circulate through the second connection line 62 by an operation of the fourth water pump 66.

Accordingly, a temperature of the coolant circulating through the second connection line 62 in the heating device 60 is increased by heat-exchanging the coolant with the refrigerant of a high temperature supplied to the sub-condenser 43 from the compressor 48.

The coolant of a high temperature passed through the sub-condenser 43 is supplied to the heater 64 through the second connection line 62 by an operation of the fourth water pump 66.

Meanwhile, the fifth valve V5 closes the second coolant line 22 for connecting the second water pump 24 with the second radiator 22 while opening the fourth branch line 36.

Accordingly, the second coolant line 21 and the battery coolant line 31 may be connected with each other by selective operations of first, second, third and fifth valves V1, V2, V3, and V5 to form one closed circuit through the coolant circulates.

Here, the waste heat generated from the electric product 14 increases a temperature of the coolant circulating through the first coolant line 11.

Moreover, the waste heat generated from the battery module 30 increases a temperature of the coolant circulating through the second coolant line 21 and the battery coolant line 31.

The coolant having the increased temperature passes through the main heat exchanger 42 by operations of the first and second water pumps 18 and 24 to be recovered while increasing a temperature of the refrigerant exhausted from the main heat exchanger 42.

Here, the condensed refrigerant passed through the sub-condenser 43 by an operation of the sub-expansion valve 49 is supplied into the main heat exchanger 42 in an expanded state. That is, the main heat exchanger 42 performs a function of evaporating the refrigerant.

Accordingly, the refrigerant having an increased temperature passed through the main heat exchanger 42 passes through the internal heat exchanger 44 and the expansion valve 45 through the refrigerant line 41 to be introduced into the compressor 48. In this case, the expansion valve 45 may supply the refrigerant to the compressor 48 without expansion.

That is, the coolant having the increased temperature is introduced into the compressor 48, and the compressor 48 compresses the coolant at higher temperature and higher pressure to introduce the compressed coolant to the sub-condenser 43.

Meanwhile, the coolant circulating through the second connection line 62 passes through the sub-condenser 43 to heat-exchange with the refrigerant of the high temperature so that the coolant having an increased temperature is supplied to the heater 64.

Accordingly, an external air introduced into the HVAC module (not shown) passes through the heater 64 into which the coolant of a high temperature to be heated, and the external air having an increased temperature is introduced into an inside of the vehicle so that the inside of the vehicle may be heated.

That is, the heat pump system 1 according to the present exemplary embodiment may use a waste heat source generated from the electric product 14 and the battery module 30 in a heating mode of the vehicle to increase a temperature of the refrigerant, thereby reducing power consumption of the compressor 48, and improving the heating efficiency.

Meanwhile, although not shown in FIG. 4, when recovering a waste heat from only the electric product 14 in the heating mode of the vehicle, in the second cooling apparatus 20, an operation of the second water pump 24 stops, and simultaneously the operation of the fifth water pump 70 stops.

Accordingly, the coolant circulates through the first coolant line 11 by an operation of the first water pump 18 to receive the waste heat generated from the electric product 14 so that a temperature of the coolant is increased. The coolant having an increased temperature may pass through the main heat exchanger 42 to heat exchange with the refrigerant, thereby increasing a temperature of the refrigerant.

In the present exemplary embodiment, an operation of increasing a temperature of the battery module 30 in the heating mode of the vehicle is described with reference to FIG. 5.

Figure 5:
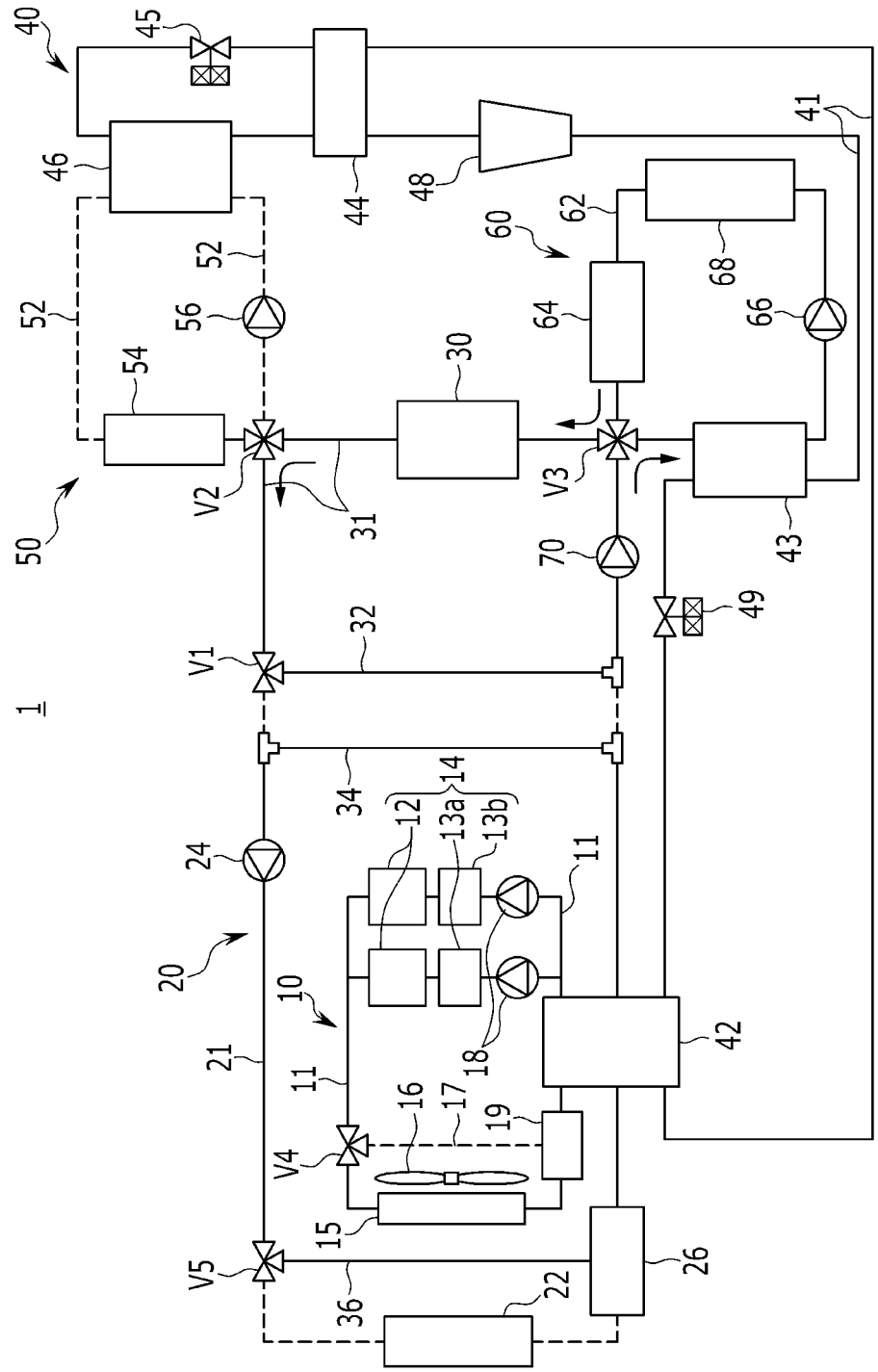
FIG. 5 is an operating state diagram illustrating an operation of heating a battery module in a heating mode of a vehicle in the heat pump system for a vehicle according to an exemplary embodiment of the present disclosure.

FIG. 5 is an operating state diagram illustrating an operation of heating a battery module in a heating mode of a vehicle in the heat pump system for a vehicle according to an exemplary embodiment of the present disclosure.

Referring to FIG. 5, when increasing the temperature of the battery module 30 in the heating mode of the vehicle, the first cooling apparatus 10 circulates the coolant through the electric product 14 by an operation of the first water pump 18.

Here, the first branch line 17 is open by an operation of the fourth valve V4. In this state, the first coolant line 11 for connecting the electric product 14 with the first radiator 15 is closed.

In addition, each constituent element of the CE module 40 is operated to circulate the refrigerant through the refrigerant line 41 in order to cool an inside of the vehicle.

The second branch line 32 is open by an operation of the first valve V1. Further, the third branch line 34 is open.

The connection of the second coolant line 21 with the battery coolant line 31 is closed through the second and third branch lines 32 and 34 open and the operation of the first valve V1.

Further, the connection of the first connection line 52 with the battery coolant line 31 is closed by an operation of the second valve V2.

Here, in the cooling device 50, an operation of the third water pump 56 stops, the flowing in the first connection line 52 stops.

Accordingly, as the operation of the cooling device 50 stops, operations of the expansion valve 45 and the evaporator 46 also stop.

Meanwhile, the battery coolant line 31 is connected with the second connection line 62 by an operation of the third valve V3.

Here, in the heating device 60, the coolant may circulate through the second connection line 62 by an operation of the fourth water pump 66.

Accordingly, the coolant circulating through the second connection line 62 in the heating device 60 is heat-exchanged with the refrigerant of a high temperature supplied to the sub-condenser 43 from the compressor 48 so that a temperature of the coolant is increased.

The coolant of the high temperature passed through the sub-condenser 43 is supplied to the heater 64 through the second connection line 62 by an operation of the fourth water pump 66.

Meanwhile, the fifth valve V5 closes the second coolant line 21 for connecting the electric product with the second radiator 22 while opening the fourth branch line 36.

Accordingly, the second coolant line 21 and the battery coolant line 31 may form independent closed circuits by selective operations of the first, second, third and fifth valves V1, V2, V3, and V5, respectively.

That is, in the second cooling apparatus 20, the third open line 34 may be connected with the coolant line 21 to form an independent closed circuit.

Accordingly, the coolant circulates through the second coolant line 21 by an operation of the second water pump 24 without passing through the second radiator 22.

Here, the waste heat generated from the electric product 14 increases a temperature of the coolant circulating through the first coolant line 11.

The coolant having an increased temperature passes through the main heat exchanger 42 by an operation of the first water pump 18 to be recovered while increasing a temperature of the refrigerant exhausted from the main heat exchanger 42.

The condensed refrigerant passed through the sub-condenser 43 by the operation of the sub-expansion valve 49 is supplied to the main heat exchanger 42 in an expanded state. That is, the main heat exchanger 42 performs a function of evaporating the refrigerant.

Accordingly, the refrigerant having an increased temperature passed through the main heat exchanger 42 passes through the internal heat exchanger 44 and the expansion valve 45 through the refrigerant line 41 to be introduced into the compressor 48. In this case, the expansion valve 45 may supply the refrigerant to the compressor 48 without expansion.

That is, the coolant having the increased temperature is introduced into the compressor 48, and the compressor 48 compresses the coolant at higher temperature and higher pressure to introduce the compressed coolant to the sub-condenser 43.

Meanwhile, the coolant circulating through the second connection line 21 passes through the sub-condenser 43 to heat-exchange with the refrigerant of the high temperature so that the coolant having an increased temperature is supplied to the heater 64. Accordingly, the external air introduced into the HVAC module (not shown) is heat-exchanged with the coolant of a high temperature introduced into the heater 64 to be heated. Next, the external air having an increased temperature may be directly introduced into an inside of the vehicle to heat the inside of the vehicle.

Here, the coolant of a high temperature passed through the heater 64 flows through the battery coolant line 31 connected by operations of the third valve V3 and the fifth water pump 70 to be supplied to the battery module 30. Accordingly, a temperature of the battery module 30 may be efficiently increased by the coolant of a high temperature supplied to the battery cooling line 21.

That is, the heat pump system 1 according to the present exemplary embodiment may use a waste heat source generated from the electric product 14 and the battery module 30 in a heating mode of the vehicle to increase a temperature of the refrigerant, thereby reducing power consumption of the compressor 48, and improving the heating efficiency.

In the present exemplary embodiment, an operation of cooling the battery module 30 in a heating mode of the vehicle is described with reference to FIG. 6.

Figure 6:
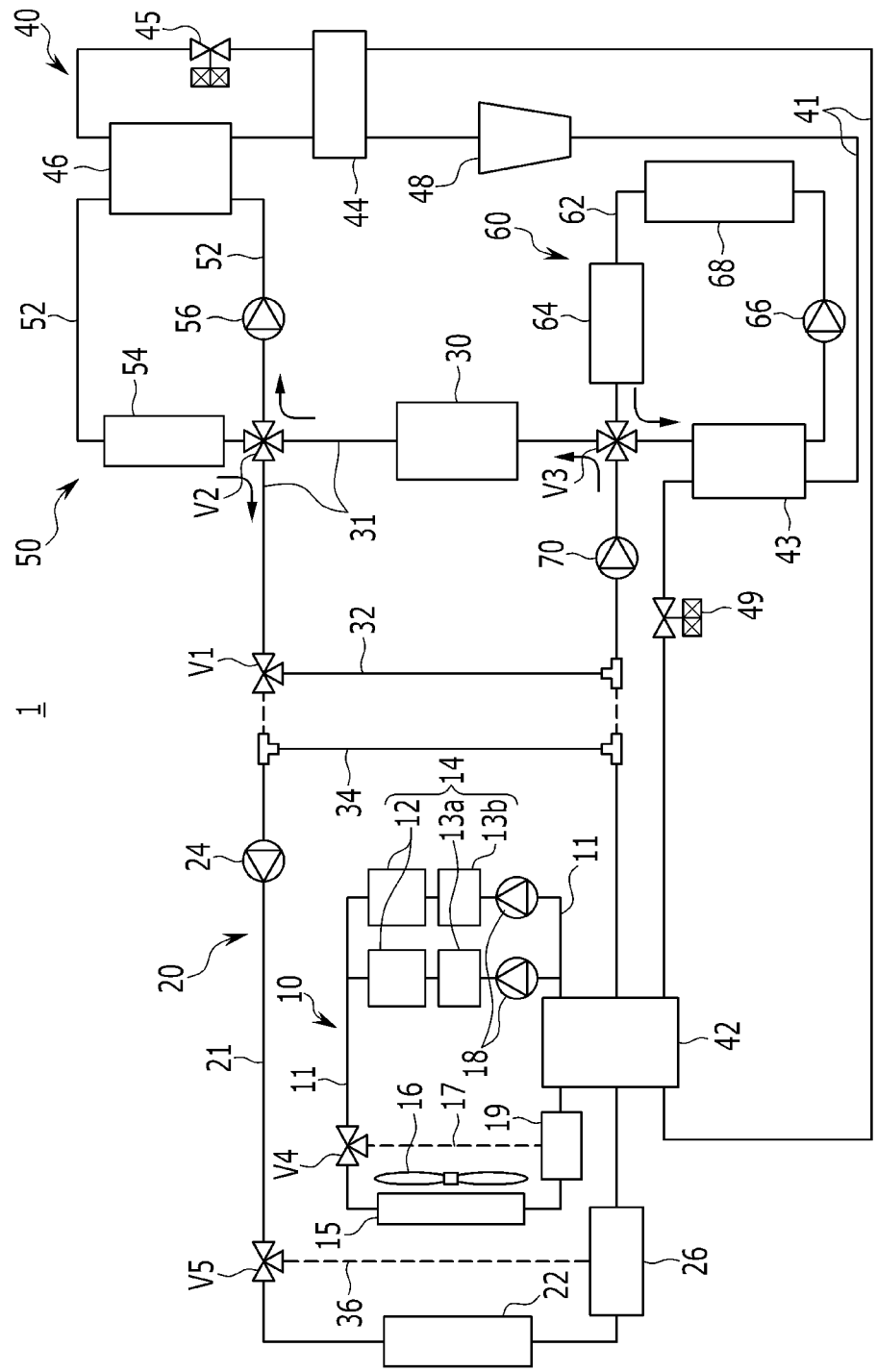
FIG. 6 is an operating state diagram illustrating an operation of cooling a battery module in a heating mode of a vehicle in the heat pump system for a vehicle according to an exemplary embodiment of the present disclosure.

FIG. 6 is an operating state diagram illustrating an operation of cooling a battery module in a heating mode of a vehicle in the heat pump system for a vehicle according to an exemplary embodiment of the present disclosure.

Referring to FIG. 6, when cooling the battery module 30 in the heating mode of the vehicle, the first water pump 18 is operated in order to cool the electric product 14 in the first cooling apparatus 10. Further, the first branch line 17 is closed by an operation of the fourth valve V4. Accordingly, the coolant cooled from the first radiator 15 is introduced into the motor 12, the power control apparatus 13a and the inverter 13b which are disposed in parallel with each other.

Further, each constituent element of the CE module 40 is operated to circulate the refrigerant through the refrigerant line 41 in order to cool an inside of the vehicle.

The second branch line 32 is open by an operation of the first valve V1. Further, the third branch line 34 is open.

The connection of the second coolant line 21 with the battery coolant line 31 is closed through the second and third branch lines 32 and 34 open and the operation of the first valve V1.

The first connection line 52 is connected with the battery coolant line 31 connected with the battery module 30 by an operation of the third valve V3.

Further, the battery coolant line 31 connected with the battery module 30 and the second connection line 62 form a closed circuit by an operation of the third valve V3.

Accordingly, the coolant circulating through the second connection line 62 in the heating device 60 is heat-exchanged with the refrigerant of a high temperature supplied to the sub-condenser 43 from the compressor 48 so that a temperature of the coolant is increased.

The coolant of the high temperature passed through the sub-condenser 43 is supplied to the heater 64 through the second connection line 62 by an operation of the fourth water pump 66.

Accordingly, the external air introduced into the HVAC module (not shown) is heat-exchanged with the coolant of a high temperature introduced into the heater 64 to be heated.

Next, the external air having an increased temperature may be directly introduced into an inside of the vehicle to heat the inside of the vehicle.

Meanwhile, the fourth branch line 36 is closed by an operation of the fifth valve V5. Simultaneously, the fifth valve V5 opens the second coolant line 21 for connecting the second radiator 22 with the second water pump 24.

Accordingly, the second coolant line 21 and the battery coolant line 31 may form independent closed circuits by selective operations of the first, second, third and fifth valves V1, V2, V3, and V5, respectively.

Accordingly, the coolant cooled from the second radiator 22 may circulate through the second coolant line 21 connected with the third branch line 34 open by an operation of the second water pump 24.

That is, the third open branch line 34 may be connected with the second coolant line 21 to form a closed circuit in the second cooling apparatus 20.

Further, the coolant of the battery coolant line 31 circulates through the battery coolant line 31, the second branch line 32, and the first connection line 52 by operations of the third and fifth water pumps 56 and 70.

That is, the coolant circulating the battery coolant line 31 flows to the first connection line 52 by operations of the second valves V2 and the third and fifth water pumps 56 and 70.

Accordingly, the coolant may circulate through the battery coolant line 31 and the first connection line 52.

Meanwhile, the main heat exchanger 42 of the CE module 40 condenses the refrigerant using the coolant flowing through the first and second coolant lines 11 and 21.

Simultaneously, the sub-condenser 43 heat-exchanges the coolant circulating through the second connection line 62 from the battery coolant line 31 by an operation of the third valve V3 with the refrigerant of a high temperature exhausted from the compressor 48 to increase a temperature of the coolant.

Further, the sub-condenser 43 primarily condenses the refrigerant by heat-exchange with the coolant to supply the condensed refrigerant to the main heat exchanger 42.

Moreover, the sub-expansion valve 49 may supply the refrigerant to the compressor 48 without expansion.

Here, the main heat exchanger 42 additionally condenses the condensed refrigerant passed through the sub-condenser 43 by heat-exchanging the condensed refrigerant with the coolant circulating through the first and second coolant lines 11 and 21 so that a condensation amount of the refrigerant is increased.

Moreover, the internal heat exchanger 44 further condenses the condensed refrigerant from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

In addition, the evaporator 46 heat-exchanges the coolant circulating through the first connection line 52 with an internally evaporated refrigerant of the low temperature by operations of the second valve V2 and the third and fifth water pumps 56 and 70.

The coolant of a low temperature passed through the evaporator 46 is supplied to the cooler 54 through the first connection line 52 by an operation of the third water pump 56.

That is, the refrigerant circulating through the refrigerant line 41 in the CE module 40 is condensed by heat-exchanging with the coolant of the second connection line 62 passing through the sub-condenser 43.

Next, the condensed refrigerant is further condensed by heat-exchanging with the coolant of the first and second coolant lines 11 and 21 passing through the main heat exchanger 42.

In addition, the internal heat exchanger 44 further condenses the refrigerant of a low temperature exhausted from the main heat exchanger 42 by heat-exchanging the condensed refrigerant with a refrigerant of a medium temperature exhausted from the evaporator 46 to further increase the condensation amount through increase of sub-cool so that the condensation amount of the refrigerant is increased.

The coolant having an increased condensation amount is expanded by the expansion valve 45, and is evaporated by the evaporator 46.

In this case, the refrigerant evaporated from the evaporator 46 cools the coolant introduced through the first connection line 52.

Here, in the evaporator 46, the refrigerant having an increased condensation amount sequentially passes through the main heat exchanger 42 and the internal heat exchanger 44 to be expanded and supplied so that the refrigerant may be evaporated at a lower temperature.

That is, in the present exemplary embodiment, the internal heat exchanger 44 further condenses the refrigerant to be advantageous in terms of forming a sub-cool of the refrigerant.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

Here, although the coolant of a low temperature is introduced into the cooler 54 through the first connection line 52, an opening door included in an HVAC module (not shown) is closed not to pass the external air through the heater 64, so that indoor heating may be prevented from being deteriorated.

The coolant of a low temperature passed through the cooler 54 flows through the battery coolant line 31 connected by operations of the second valve V2 and the fifth water pump 70 to be supplied to the battery module 30.

Accordingly, the battery module 30 may be efficiently cooled by the coolant of a low temperature supplied to the battery cooling line 31.

In the present exemplary embodiment, an operation in a dehumidification mode of the vehicle is described with reference to FIG. 7.

Figure 7:
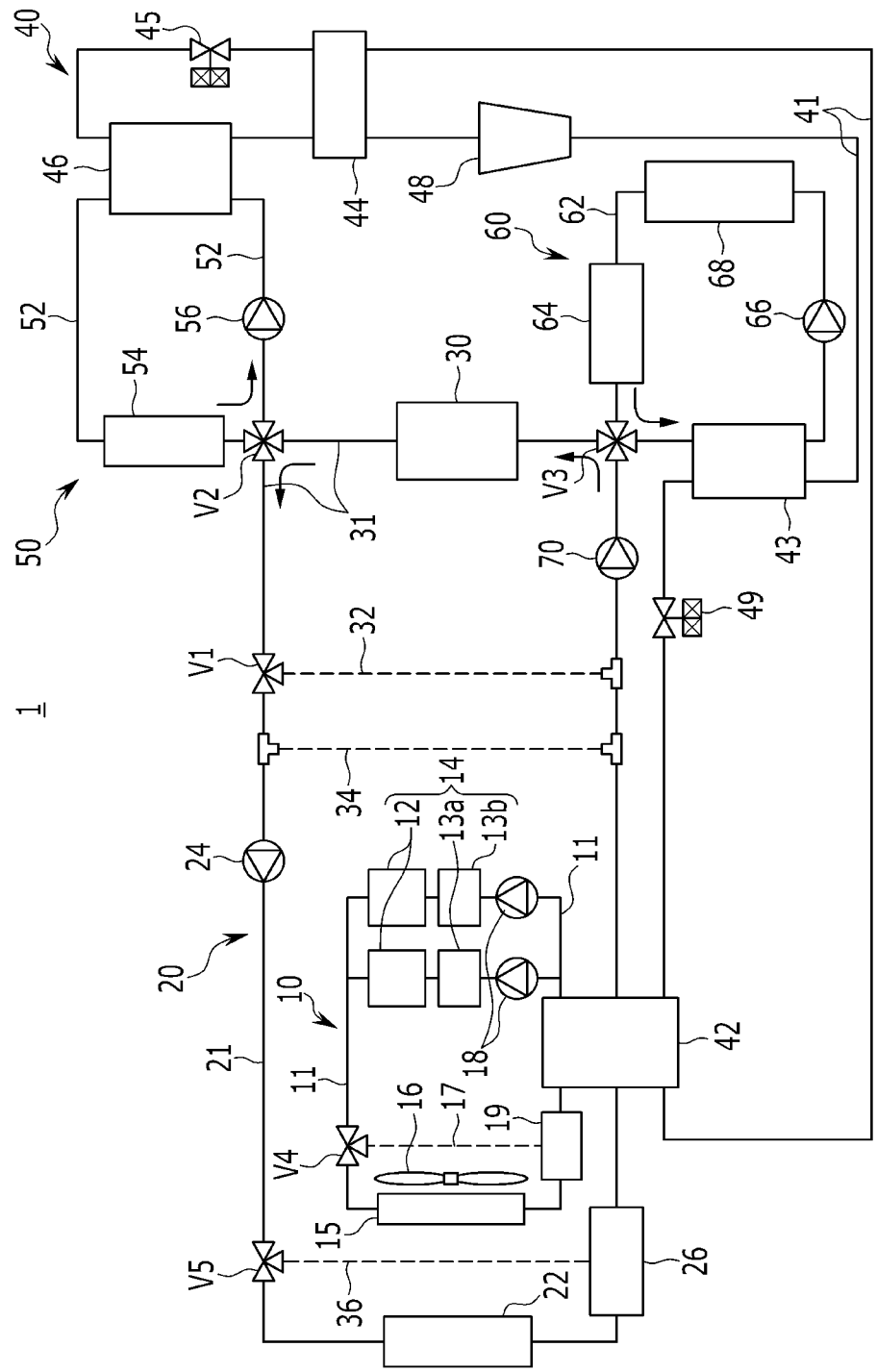
FIG. 7 is an operating state diagram illustrating an operation of a dehumidification mode of a vehicle in the heat pump system for a vehicle according to an exemplary embodiment of the present disclosure.

FIG. 7 is an operating state diagram illustrating an operation of a dehumidification mode of a vehicle in the heat pump system for a vehicle according to an exemplary embodiment of the present disclosure.

Referring to FIG. 7, in the first cooling apparatus 10, the first water pump 18 is operated to cool the electric product 14.

Moreover, the first branch line 17 is closed by an operation of the fourth valve V4. Accordingly, the coolant cooled from the first radiator 15 is introduced into the motor 12, the power control apparatus 13a and the inverter 13b which are disposed in parallel with each other.

Further, each constituent element of the CE module 40 is operated to circulate the refrigerant through the refrigerant line 41 in order to cool an inside of the vehicle.

The second branch line 32 is closed by an operation of the first valve V1. Further, the third branch line 34 is closed.

Accordingly, the second coolant line 21 is connected with the battery coolant line 31 by the second and third branch lines 32 and 34 closed.

The battery coolant line 31 and the first connection line 52 forms an independent closed circuit by an operation of the second valve V2, respectively.

Further, the battery coolant line 31 and the second connection line 62 form an independent closed circuit by an operation of the third valve V3, respectively.

Here, the cooling device 50 and the heating device 60, by operations of the third and fourth water pumps 56 and 66, the coolant may circulate through the first and second connection lines 52 and 62, respectively.

The fourth branch line 36 is closed by an operation of the fifth valve V5. Simultaneously, the fifth valve V5 opens the second coolant line 21 for connecting the second radiator 22 with the second water pump 24.

Accordingly, the second coolant line 21 and the battery coolant line 31 may form independent closed circuits by selective operations of the first, second, third and fifth valves V1, V2, V3, and V5, respectively.

Accordingly, the coolant cooled from the second radiator 22 may circulate through the second coolant line 21 and the battery coolant line 31 by an operation of the second water pump 24.

Meanwhile, the main heat exchanger 42 of the CE module 40 condenses the refrigerant using the coolant flowing through the first and second coolant lines 11 and 21.

Simultaneously, the sub-condenser 43 heat-exchanges the coolant circulating through the second connection line 62 from the battery coolant line 31 by operations of the third valve V3 and the fourth water pump 66 with the refrigerant of a high temperature exhausted from the compressor 48 to increase a temperature of the coolant.

Further, the sub-condenser 43 primarily condenses the refrigerant by heat-exchange with the coolant to supply the condensed refrigerant to the main heat exchanger 42.

Moreover, the sub-expansion valve 49 may supply the refrigerant to the compressor 48 without expansion.

The main heat exchanger 42 additionally condenses the condensed refrigerant passed through the sub-condenser 43 by heat-exchanging the condensed refrigerant with the coolant circulating through the first and second coolant lines 11 and 21 so that a condensation amount of the refrigerant is increased.

Moreover, the internal heat exchanger 44 further condenses the condensed refrigerant from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

In addition, the evaporator 46 heat-exchanges the coolant circulating through the first connection line 52 with an internally evaporated refrigerant of the low temperature by operations of the second valve V2 and the third water pump 56.

The coolant of a low temperature passed through the evaporator 46 is supplied to the cooler 54 through the first connection line 52 by an operation of the third water pump 56.

That is, the refrigerant circulating through the refrigerant line 41 in the CE module 40 is condensed by heat-exchanging with the coolant of the second connection line 62 passing through the sub-condenser 43.

Next, the condensed refrigerant is further condensed by heat-exchanging with the coolant of the first and second coolant lines 11 and 21 passing through the main heat exchanger 42.

In addition, the internal heat exchanger 44 further condenses the refrigerant of a low temperature exhausted from the main heat exchanger 42 by heat-exchanging the condensed refrigerant with a refrigerant of a low temperature exhausted from the evaporator 46 to further increase the condensation amount through increase of sub-cool so that the condensation amount of the refrigerant is increased.

The coolant having an increased condensation amount is expanded by the expansion valve 45, and is evaporated by the evaporator 46.

In this case, the refrigerant evaporated from the evaporator 46 cools the coolant introduced through the first connection line 52.

Here, in the evaporator 46, the refrigerant having an increased condensation amount sequentially passes through the main heat exchanger 42 and the internal heat exchanger 44 to be expanded and supplied so that the refrigerant may be evaporated at a lower temperature.

That is, in the present exemplary embodiment, the internal heat exchanger 44 further condenses the refrigerant to be advantageous in terms of forming a sub-cool of the refrigerant.

Meanwhile, the refrigerant evaporated from the evaporator 46 cools the coolant introduced through the first connection line 52. Accordingly, the coolant passes through the evaporator 46 to be cooled at a low temperature, and the cooled coolant is supplied to the cooler 54 through the first connection line 52.

Further, the coolant circulating through the second connection line 62 in the heating device 60 is heat-changed with the refrigerant of a high temperature supplied from the compressor 48 in the sub-condenser 43 so that the temperature of the coolant is increased.

The coolant of a high temperature passed through the sub-condenser 43 is supplied to the heater 64 through the second connection line 62 by an operation of the fourth water pump 66.

In this state, an opening door included in the HVAC module (not show) is open to pass the external air through both of the cooler 54 and the heater 64.

Accordingly, the external air introduced into the HVAC module passes through the cooler 54 into which the coolant of a low temperature is introduced and the heater 64 into which the coolant of a high temperature is introduced to be dehumidified, and the dehumidified external air is introduced into the inside of the vehicle to dehumidify the inside of the vehicle.

Meanwhile, although not shown in the drawings, when an external temperature is low in a dehumidification mode, the fourth branch line 36 closed may be open by an operation of the fifth valve V5, and the coolant line for connecting the second radiator 22 to the second water pump 24 may be closed.

Next, an operation of increasing a temperature of the battery module 30 using the internal heater 68 in a state that a cooling or heating mode of the vehicle stops is described with reference to FIG. 8.

Figure 8:
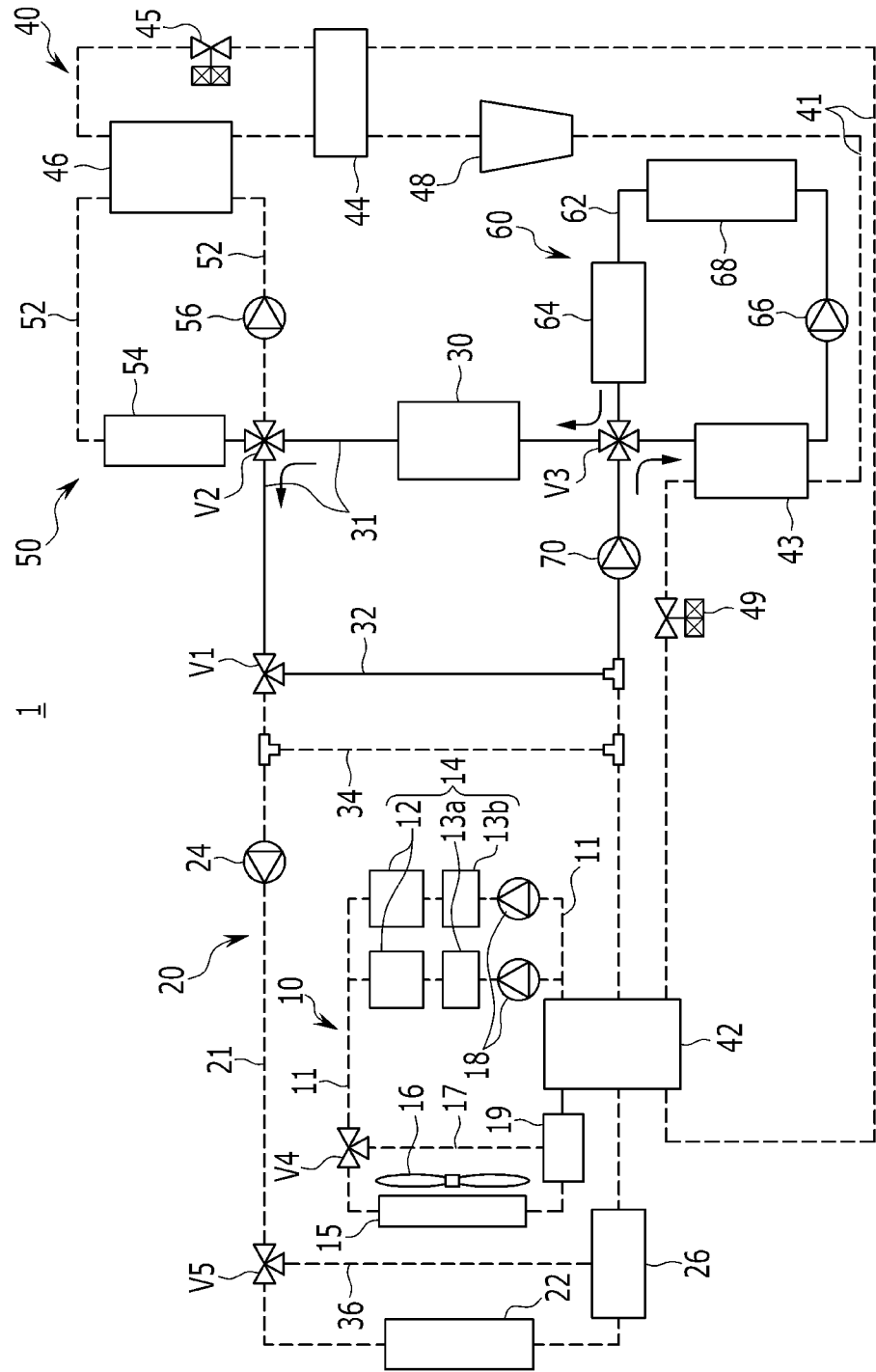
FIG. 8 is an operating state diagram illustrating an operation of heating a battery module using an internal heater when a cooling mode or a heating mode of a vehicle is not operated in the heat pump system for a vehicle according to an exemplary embodiment of the present disclosure.

FIG. 8 is an operating state diagram illustrating an operation of increasing a temperature of a battery module using an internal heater when a cooling mode or a heating mode of a vehicle is not operated in the heat pump system for a vehicle according to an exemplary embodiment of the present disclosure.

Referring to FIG. 8, in order to increase the temperature of a battery module using an internal heater 68 in a state that the cooling mode or the heating mode of a vehicle is not operated, operations of the first and second cooling apparatuses 10 and 20 and the CE module 40 stop.

That is, in the first and second cooling apparatuses 10 and 20, operations of the first and second water pumps 18 and 24 stop to stop the circulation of the refrigerant. Further, the circulation of the refrigerant through the CE module 40 stops.

Here, the second branch line 32 is open by an operation of the first valve V1. Moreover, the third branch line 34 is closed.

Accordingly, the battery coolant line 31 is connected with the second open branch line 32.

The connection of the first connection line 52 with the battery coolant line 31 is closed by an operation of the second valve V2.

Further, the second connection line 62 may be connected with the battery coolant line 31 by an operation of the third valve V3.

Accordingly, in the heating device 60, the coolant may circulate through the second connection line 62 by an operation of the fourth water pump 66. Here, the internal heater 68 is operated to heat the coolant circulating through the second connection line 62.

The coolant having an increased temperature circulates through the battery coolant line 31 from the second connection line 62 by operations of the fourth and 5 water pumps 66 and 70 to pass through the battery module 30.

Accordingly, a temperature of the battery module 30 may be efficiently increased by the coolant of a high temperature supplied to the battery coolant line 31.

As described above, if the heat pump system for a vehicle according to an exemplary embodiment of the present disclosure is applied, a system may be simplified and a layout of connection pipes may be simplified by selectively heat-exchanging heat energy generated from a coolant upon condensing and evaporation of the coolant to control an internal temperature of the vehicle using a heat-exchanged coolant of a low temperature or a high temperature.

Further, the heat pump system 1 may improve heating efficiency of the vehicle using waste heat of an electric product 14 and a battery module 30, and may increase the whole travel distance of the vehicle through efficient temperature control of a battery module in order to obtain the optimal performance of the battery module.

Moreover, the present disclosure may reduce a size and weight by packaging a Centralized Energy Module (CEmodule) 40 for generating heat energy through condensing and evaporation of a coolant.

In addition, the present disclosure may prevent noise, vibration and operational instability from being generated as compared with an air conditioner according to the related art by using an R152-a, or an R744, or an R290 of the high performance in a CE module.

Further, the present disclosure may increase sub-cool of a refrigerant to improve cooling performance and efficiency by configuring a sub-condenser 43 and an internal heat exchanger 44 together in order to increase a condensation amount of the refrigerant in the CE module.

In addition, the present disclosure may reduce a manufacturing cost and weight, and may improve space utilization by simplifying the entire system.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A heat pump system of a vehicle, comprising:
   a first cooling apparatus including a first radiator, an electric product including at least one motor, and at least one first water pump which are connected with a first coolant line, the first cooling apparatus configured to circulate a coolant through the first coolant line;
   a second cooling apparatus including a second radiator and a second water pump which are connected with a second coolant line, the second cooling apparatus configured to circulate a coolant through the second coolant line;
   a battery module provided at a battery coolant line selectively connected with the second coolant line;
   a cooling device connected with the battery coolant line through a second valve so as to configure a first connection line for cooling an inside of the vehicle by selectively forming an independent closed circuit, and including a third water pump and a cooler provided at the first connection line;
   a heating device connected with the battery coolant line through a third valve so as to configure a second connection line for heating the inside of the vehicle by selectively forming the independent closed circuit, and including a fourth water pump and a heater provided at the second connection line; and
   a centralized energy (CE) module connected with the second coolant line and the first and second connection lines in order to supply a coolant of a low temperature to the cooling device, and to supply a coolant of a high temperature to the heating device, and to selectively heat-exchange heat energy generated upon condensing and evaporation of a refrigerant circulating inside the coolant.

2. The heat pump system of the vehicle of claim 1, wherein:
   the at least one motor comprises two motors that are coupled at the first coolant line in parallel, and
   the at least one first water pump comprises two first water pumps that are disposed in parallel to introduce the coolant into the two motors, respectively.

3. The heat pump system of the vehicle of claim 1, wherein:
   the second cooling apparatus supplies the coolant into the battery coolant line selectively connected by an operation of the first valve to cool the battery module.

4. The heat pump system of the vehicle of claim 1, wherein the CE module comprises:
   a main heat exchanger provided at the second coolant line between the second radiator and the battery module to condense and evaporate the refrigerant;
   an expansion valve connected with the main heat exchanger through the refrigerant line;
   an evaporator connected with the expansion valve through the refrigerant line, and provided at the first connection line so the cooling device cools the coolant circulating through the first connection line; and
   a compressor provided at the refrigerant line between the evaporator and the main heat exchanger.

5. The heat pump system of the vehicle of claim 4, wherein:
the refrigerant line comprises an internal heat exchanger between the evaporator and the compressor.

6. The heat pump system of the vehicle of claim 5, wherein:
the refrigerant line for connecting the main heat exchanger with the expansion valve, and the refrigerant line for connecting the evaporator with the compressor are connected with the internal heat exchanger, respectively, and
when the main heat exchanger condenses the refrigerant, the internal heat exchanger heat-exchanges the condensed refrigerant from the main heat exchanger with the refrigerant of a low temperature exhausted from the evaporator to further condense the refrigerant and to introduce the refrigerant to the expansion valve.

7. The heat pump system of the vehicle of claim 4, wherein:
the first valve selectively connects the second coolant line with the battery coolant line between the second radiator and the battery module, and
the second valve and the third valve are provided at the battery coolant line while interposing the battery module therebetween and selectively connects the battery coolant line with the first and second connection lines.

8. The heat pump system of the vehicle of claim 4, wherein the CE module comprises:
a sub-condenser connected with the compressor through the refrigerant line between the main heat exchanger and the compressor, and provided at the second connection line so that the heating device heats the coolant circulating through the second connection line; and
a sub-expansion valve provided at the coolant line between the sub-condenser and the main heat exchanger.

9. The heat pump system of the vehicle of claim 8, wherein:
the first cooling apparatus comprises a first branch line connected with the first coolant line between the first radiator and the first water pump through a fourth valve provided at the first coolant line between the first radiator and the first water pump,
the battery coolant line comprises a second branch line for connecting the battery module with the cooling device and the heating device through the first valve, and for closing connection with the second cooling apparatus,
the second coolant line comprises a third branch line for separating the battery coolant line and the second coolant line from each other, and
a fourth branch line connected with the second coolant line between the second radiator and the second water pump through a fifth valve is provided at the second coolant line between the second radiator and the second water pump.

10. The heat pump system of the vehicle of claim 9, wherein:
when the battery module is cooled together with the electric product in a cooling mode of the vehicle,
the coolant circulates through the electric product by an operation of a first water pump in the first cooling apparatus,
the second branch line is open by an operation of the first valve, the third branch line is open, and connection between the second coolant line and the battery coolant line is closed by the second and third open lines,
the battery coolant line connected with the battery module is connected with the first connection line by an operation of the second valve,
connection between the battery coolant line and the second connection line is closed by an operation of the third valve,
the first branch line is closed by an operation of the fourth valve,
the fourth branch line is closed by an operation of the fifth valve, and
the refrigerant circulates through the CE module, the main heat exchanger condenses the refrigerant, and operations of the sub-condenser and the sub-expansion valve stop.

11. The heat pump system of the vehicle of claim 10, wherein:
the evaporator heat-exchanges the coolant circulating through the first connection line from the battery coolant line by an operation of the second valve with an internally evaporated refrigerant of a low temperature to cool the coolant,
the coolant of the low temperature passed through the evaporator is supplied to the cooler through the first connection line by an operation of the third water pump, and
the coolant of the low temperature passed through the cooler is supplied to the battery module through the battery coolant line connected by an operation of the second valve to cool the battery module.

12. The heat pump system of the vehicle of claim 10, wherein:
the first cooling apparatus supplies the coolant cooled from the first radiator to the main heat exchanger by an operation of the first water pump.

13. The heat pump system of the vehicle of claim 10, wherein:
in the second cooling apparatus,
the second open branch line is connected with the second coolant line to form an independent closed circuit, and the coolant cooled from the second radiator is supplied to the main heat exchanger by an operation of the second water pump.

14. The heat pump system of the vehicle of claim 9, wherein:
when increasing a temperature of the battery module in a cooling mode of the vehicle,
the first cooling apparatus circulates the coolant through the electric product by an operation of a first water pump,
the second branch line is open by an operation of the first valve, the third branch line is open, and connection between the second coolant line and the battery coolant line is closed by the second and third open lines,
the battery coolant line connected with the battery module and the first connection line form an independent closed circuit by an operation of the second valve,
the battery coolant line is connected with the second connection line by an operation of the third valve,
the first branch line is closed by an operation of the fourth valve,
the fourth branch line is closed by an operation of the fifth valve, and
the refrigerant circulates through the CE module, the main heat exchanger and the sub-condenser condense the refrigerant, and an operation of the sub-expansion valve stops.

15. The heat pump system of the vehicle of claim 14, wherein:
- the sub-condenser heat-exchanges the coolant circulating the second connection line from the battery coolant line by an operation of the third valve with the coolant of a high temperature supplied from the compressor to heat the coolant,
- the coolant of the high temperature from the sub-condenser is supplied to the heater through the second connection line by an operation of the fourth water pump, and
- the coolant of the high temperature from the heater is supplied to the battery module through the battery coolant line connected by an operation of the third valve to increase a temperature of the battery module.

16. The heat pump system of the vehicle of claim 9, wherein:
- when recovering a waste heat of the battery module and the electric product in a heating mode of the vehicle,
- the coolant circulates through the electric produce by an operation of a first water pump in the first cooling apparatus,
- the second branch line is closed by an operation of the first valve, the third branch line is closed, and the second coolant line is connected with the battery coolant line by the second and third closed lines,
- connection between the battery coolant line and the first connection line is closed by an operation of the second valve,
- the battery coolant line and the second connection line form an independent closed circuit by an operation of the third valve,
- in a state that the first branch line is open by an operation of the fourth valve, the first coolant line for connecting the electric product with the first radiator is closed,
- in a state that the fourth branch line is open by an operation of the fifth valve, the second coolant line for connecting the second water pump with the second radiator is closed,
- the coolant circulates through the second connection line by the fourth water pump in the heating device, and
- the refrigerant circulates through the CE module, operations of the expansion valve and the evaporator stop, the sub-expansion valve is operated to expand and supply the refrigerant from the sub-condenser to the main heat exchanger.

17. The heat pump system of the vehicle of claim 16, wherein:
- a waste heat generated from the electric product increases a temperature of the coolant circulating through the first coolant line,
- a waste heat generated from the battery module increases a temperature of the coolant circulating through the second coolant line and the battery coolant line,
- each coolant having an increase temperature from the first coolant line and the second coolant line is recovered while increasing a temperature of the refrigerant from the main heat exchanger, and
- the heating device supplies the coolant circulating through the second connection line heated by heat-exchanging with the refrigerant of a high temperature from the compressor in the sub-condenser to the heater.

18. The heat pump system of the vehicle of claim 9, wherein:
- when increasing a temperature of the battery module in a heating mode of the vehicle,
- the coolant circulates the electric product by a first water pump in the first cooling apparatus,
- the second branch line is open by an operation of the first valve, the third branch line is open, and connection between the second coolant line and the battery coolant line is closed the second and third open branch lines,
- connection between the battery coolant line and the first connection line is closed by an operation of the second valve,
- the battery coolant line is connected with the second connection line by an operation of the third valve,
- in a state that the first branch line is open by an operation of the fourth valve, the first coolant line for connecting the electric product with the first radiator is closed,
- in a state that the fourth branch line is open by an operation of the fifth valve, the coolant line for connecting the electric product with the radiator is closed, and
- the refrigerant circulates through the CE module, operations of the expansion valve and the evaporator stop, the sub-expansion valve is operated to expand and supply the refrigerant from the sub-condenser to the main heat exchanger.

19. The heat pump system of the vehicle of claim 9, wherein:
- when cooling the battery module in a heating mode of the vehicle,
- the coolant circulates through the electric product by an operation of a first water pump in the first cooling apparatus,
- the second branch line is open by an operation of the first valve, the third branch line is open, and connection between the second coolant line and the battery coolant line is closed by the second and third open branch lines,
- the battery coolant line connected with the battery module is connected with the first connection line by an operation of the second valve,
- the battery coolant line and the second connection line form an independent closed circuit by an operation of the third valve,
- the first branch line is closed by an operation of the fourth valve,
- the fourth branch line is closed by an operation of the fifth valve, and
- the refrigerant circulates through the CE module, the main heat exchanger and the sub-condenser condense the refrigerant, and an operation of the sub-expansion valve stops.

20. The heat pump system of the vehicle of claim 9, wherein:
- in a dehumidification mode of the vehicle,
- the coolant circulates through the electric product by a first water pump in the first cooling apparatus,
- the second branch line is closed by an operation of the first valve, the third branch line is closed, and the second coolant line is connected with the battery coolant line by the second and third closed branch line, the battery coolant line and the first connection line form an independent closed circuit by an operation of the second valve, the battery coolant line and the second connection line form an independent closed circuit by an operation of the third valve, the first branch line is closed by the fourth valve, the fourth branch line is closed by an operation of the fifth valve, the coolant circulates through first and second connection lines by operations of the third and fourth water pumps in the cooling device and the heating device, respectively, and the refrigerant circulates through the CE module.

21. The heat pump system of the vehicle of claim 9, wherein:

the heating device further comprises an internal heater provided at the second connection line, when increasing a temperature of the battery module using the internal heater in a state that a cooling or heating mode of the vehicle stops, operations of the first and second water pumps stop to stop the circulation of the coolant in the first and second cooling apparatus, circulation of the refrigerant stops in the CE module, the second branch line is open by an operation of the first valve, the third branch line is closed, and the battery coolant line is connected with the second open branch line, connection between the battery coolant line and the first connection line is closed by an operation of the second valve, and the battery coolant line is connected with the second connection line by an operation of the third valve.

22. The heat pump system of the vehicle of claim 21, wherein:

a fifth water pump is provided between the second branch line and the battery module in the battery coolant line.

23. The heat pump system of the vehicle of claim 1, wherein:

the heating device further comprises an internal heater provided at the second connection line.

* * * * *